US012597687B2

(12) United States Patent
Ding et al.

(10) Patent No.: US 12,597,687 B2
(45) Date of Patent: Apr. 7, 2026

(54) PHASE SHIFTER, ANTENNA, AND ELECTRONIC APPARATUS

(71) Applicants: Beijing BOE Sensor Technology Co., Ltd., Beijing (CN); BOE TECHNOLOGY GROUP CO., LTD., Beijing (CN)

(72) Inventors: Yi Ding, Beijing (CN); Yifeng Qin, Beijing (CN); Hailong Lian, Beijing (CN); Feng Qu, Beijing (CN); Chuncheng Che, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 300 days.

(21) Appl. No.: 18/579,891

(22) PCT Filed: Jul. 27, 2022

(86) PCT No.: PCT/CN2022/108159
§ 371 (c)(1),
(2) Date: Jan. 18, 2024

(87) PCT Pub. No.: WO2024/020834
PCT Pub. Date: Feb. 1, 2024

(65) Prior Publication Data
US 2025/0079673 A1 Mar. 6, 2025

(51) Int. Cl.
*H01P 1/18* (2006.01)
*H01Q 3/36* (2006.01)

(52) U.S. Cl.
CPC ................. *H01P 1/18* (2013.01); *H01Q 3/36* (2013.01)

(58) Field of Classification Search
CPC .................................... H01P 1/18; H01Q 3/36
(Continued)

(56) References Cited

U.S. PATENT DOCUMENTS 11,728,552 B2 * 8/2023 Sun .......................... H01Q 3/36 342/371
2022/0006188 A1 1/2022 Tang et al.
(Continued)

FOREIGN PATENT DOCUMENTS

CN 108711669 A 10/2018
CN 110943299 A 3/2020
(Continued)

*Primary Examiner* — Harry K Liu
(74) *Attorney, Agent, or Firm* — HOUTTEMAN LAW LLC

(57) ABSTRACT

A phase shifter, including: first and second substrates opposite to each other; an adjustable dielectric layer and a plurality of pillar supports between the first and second substrates; first and second conductive layers on sides of first and second substrates close to the adjustable dielectric layer, respectively, where patterns of the first and second conductive layers include at least one first electrode and at least one second electrode, respectively, orthographic projections of the at least one first electrode and the at least one second electrode on the first substrate at least partially overlap each other; orthographic projections of each of the plurality of pillar support, and the pattern of the first conductive layer on the first substrate do not overlap each other, and the pillar supports of the plurality of pillar supports close to an edge of the pattern of the first conductive layer are equally spaced apart therefrom.

20 Claims, 15 Drawing Sheets

(58) Field of Classification Search
USPC .......................................................... 342/372
See application file for complete search history.

(56) References Cited

U.S. PATENT DOCUMENTS

| | | | |
|---|---|---|---|
| 2022/0045413 A1 | 2/2022 | Jia et al. | |
| 2022/0102873 A1* | 3/2022 | Wang ........................ | H01P 5/19 |
| 2022/0140461 A1 | 5/2022 | Wang et al. | |

FOREIGN PATENT DOCUMENTS

| | | | |
|---|---|---|---|
| CN | 112448105 | A | 3/2021 |
| CN | 113871819 | A | 12/2021 |
| CN | 114122649 | A | 3/2022 |
| CN | 114256571 | A | 3/2022 |
| WO | WO2021143820 | A1 | 7/2021 |

* cited by examiner

PHASE SHIFTER, ANTENNA, AND ELECTRONIC APPARATUS

TECHNICAL FIELD

The present disclosure relates to the field of communication technologies, in particular, to a phase shifter, an antenna, and an electronic apparatus.

BACKGROUND

Benefiting from the progress of new materials, new processes and algorithms, phase shifters have gradually exhibited unique advantages of small and exquisite structures, low cost, reconfigurable performance, etc., and thus have been widely used. For a liquid crystal phase shifter, a liquid crystal capacitor may be introduced periodically, and a dielectric constant of a liquid crystal layer may be adjusted by controlling orientation of liquid crystal molecules, so that a total capacitance in unit length of branch may be adjusted, and the phase shifting effect may be achieved. How to improve the phase shifting performance of the phase shifter becomes a technical problem which needs to be solved urgently.

SUMMARY

The present disclosure provides a phase shifter, an antenna, and an electronic apparatus, to ensure uniformity of heights of pillar supports, and improve phase shifting performance of the phase shifter.

In a first aspect, an embodiment of the present disclosure provides a phase shifter, including:

- a first substrate and a second substrate opposite to each other;
- an adjustable dielectric layer and a plurality of pillar supports, each of which being between the first substrate and the second substrate;
- a first conductive layer on a side of the first substrate close to the adjustable dielectric layer; and
- a second conductive layer on a side of the second substrate close to the adjustable dielectric layer, where a pattern of the first conductive layer includes at least one first electrode, a pattern of the second conductive layer includes at least one second electrode, and an orthographic projection of the at least one first electrode on the first substrate at least partially overlaps an orthographic projection of the at least one second electrode on the first substrate;
- where an orthographic projection of each of the plurality of pillar support, which are on the first substrate, on the first substrate and an orthographic projection of the pattern of the first conductive layer on the first substrate do not overlap each other, and the pillar supports of the plurality of pillar supports close to an edge of the pattern of the first conductive layer are equally spaced apart from the edge of the pattern of the first conductive layer.

In a possible implementation, the pillar supports of the plurality of pillar supports close to the edge of the pattern of the first conductive layer are each spaced apart from the edge of the pattern of the first conductive layer by a first distance, and any two adjacent ones of the plurality of pillar supports are spaced apart from each other by a second distance, where the first distance is equal to the second distance.

In a possible implementation, the at least one first electrode includes a first signal sub-electrode and a second signal sub-electrode spaced apart from each other, and a part of the plurality of pillar supports are in a region between the first signal sub-electrode and the second signal sub-electrode.

In a possible implementation, the plurality of pillar supports includes a plurality of main pillar supports and a plurality of auxiliary pillar supports at intervals on the first substrate, where an end of each of the plurality of main pillar supports away from the first substrate is in contact with the second substrate, and an end of each of the plurality of auxiliary pillar supports away from the first substrate is in suspension.

In a possible implementation, an end of each of the plurality of main pillar supports close to the first substrate is in contact with the first substrate.

In a possible implementation, between an end of each of the plurality of main pillar supports close to the first substrate and the first substrate is disposed a padding layer, and a height of each of the plurality of main support sections is equal to a height of each of the plurality of auxiliary pillar supports in a direction pointing from the first substrate to the second substrate.

In a possible implementation, the at least one second electrode includes a patch electrode attached to the side of the second substrate close to the adjustable dielectric layer, an orthographic projection of the first signal sub-electrode on the first substrate at least partially overlaps an orthographic projection of the patch electrode on the first substrate, and an orthographic projection of the second signal sub-electrode on the first substrate at least partially overlaps the orthographic projection of the patch electrode on the first substrate.

In a possible implementation, the at least one first electrode includes a first signal electrode, the at least one second electrode includes a second signal electrode, and the first signal electrode includes a first main part extending in a first direction, and a plurality of first branch parts each connected to the first main part and extending in a second direction intersecting the first direction; and

- the second signal electrode includes a second main part extending in the first direction, and a plurality of second branch parts each connected to the second main part and extending in the second direction, and an orthographic projection of each of the plurality of first branch parts on the first substrate at least partially overlaps an orthographic projection of a corresponding one of the plurality of second branch parts on the first substrate.

In a possible implementation, the at least one first electrode further includes a plurality of first ground electrodes at intervals on the side of the first substrate close to the adjustable dielectric layer, each of the plurality of first ground electrodes is connected to a second ground electrode on a side of the first substrate away from the adjustable dielectric layer through a via extending through the first substrate, an orthographic projection of each of the plurality of first ground electrodes on the first substrate is completely within an orthographic projection of the second ground electrode on the first substrate, and the orthographic projection of each of the first ground electrodes on the first substrate at least partially overlaps the orthographic projection of the patch electrode on the first substrate.

In a possible implementation, the at least one first electrode includes a first patch sub-electrode and a second patch sub-electrode attached to the side of the first substrate close to the adjustable dielectric layer and spaced apart from each other, the at least one second electrode includes a third ground electrode and a third signal electrode, the third ground electrode includes a first ground sub-electrode and a second ground sub-electrode paced apart from each other, the third signal electrode is located between the first ground sub-electrode and the second ground sub-electrode, and an orthographic projection of the third signal electrode on the first substrate partially overlaps an orthographic projection of the first patch sub-electrode on the first substrate, and partially overlaps an orthographic projection the second patch sub-electrode on the first substrate, and a part of the plurality of pillar supports are in a region between the third ground electrode and the first substrate.

In a possible implementation, a part of the plurality of supports are in a region between the third ground electrode and the third signal electrode.

In a possible implementation, the at least one second electrode includes a third patch sub-electrode and a fourth patch sub-electrode attached to the side of the second substrate close to the adjustable dielectric layer and spaced apart from each other, the at least one first electrode includes a fourth ground electrode and a fourth signal electrode, the fourth ground electrode includes a third ground sub-electrode and a fourth ground sub-electrode spaced apart from each other, the fourth signal electrode is between the third ground sub-electrode and the fourth ground sub-electrode, the third ground sub-electrode includes a third main part extending in a third direction, and a plurality of third branch parts each connected to the third main part and extending in a fourth direction intersecting the third direction, the fourth ground sub-electrode includes a fourth main part extending in the third direction, and a plurality of fourth branch parts each connected to the fourth main part and extending in the fourth direction, an orthographic projection of each of the plurality of third branch parts on the first substrate at least partially overlaps an orthographic projection of the third patch sub-electrode on the first substrate, an orthographic projection of each of the plurality of fourth branch parts on the first substrate at least partially overlaps an orthographic projection of the fourth patch electrode on the first substrate, the fourth signal electrode includes a fifth main part extending in the third direction, and a plurality of fifth branch parts each connected to the fifth main part and extending in the fourth direction, an orthographic projection of the plurality of fifth branch parts on the first substrate at least partially overlaps the orthographic projections of the third patch sub-electrode and the fourth patch sub-electrode on the first substrate.

In a possible implementation, the at least one second electrode includes a patch electrode attached to the side of the second substrate close to the adjustable dielectric layer, the at least one first electrode includes a fifth ground electrode and a fifth signal electrode, the fifth ground electrode includes a fifth ground sub-electrode and a sixth ground sub-electrode spaced apart from each other, the fifth signal electrode is between the fifth ground sub-electrode and the sixth ground sub-electrode, and an orthographic projection of the fifth signal electrode on the first substrate is completely within an orthographic projection of the patch electrode on the first substrate.

In a second aspect, an embodiment of the present disclosure further provides an antenna, including:

the phase shifter as described in any one of the above embodiments; and a feeding unit and a radiating unit each coupled to the phase shifter, where the feeding unit is configured to couple a radio frequency signal received by the feeding unit to the phase shifter, the phase shifter is configured to shift a phase of the radio frequency signal to obtain a phase-shifted signal, and couple the phase-shifted signal to the radiating unit, such that the radiating unit radiates an electromagnetic wave signal corresponding to the phase-shifted signal.

In a possible implementation, the antenna further includes a second dielectric substrate on a side of the second substrate away from the adjustable dielectric layer, and a third conductive layer between the second dielectric substrate and the second substrate, where a pattern of the third conductive layer includes a sixth ground electrode.

In a possible implementation, the radiating unit and the feeding unit are both on a side of the second dielectric substrate away from the second substrate and are spaced apart from each other in a same layer, and an orthographic projection of the radiating unit on the second substrate and an orthographic projection of the feeding unit on the second substrate do not overlap each other.

In a possible implementation, the third conductive layer includes a first via and a second via penetrating through the third conductive layer in a thickness direction of the third conductive layer, an orthographic projection of the first via on the second substrate is completely within the orthographic projection of the feeding unit on the second substrate, and an orthographic projection of the second via on the second substrate is completely within the orthographic projection of the radiating unit on the second substrate.

In a possible implementation, the antenna further includes a first dielectric substrate on a side of the first substrate away from the adjustable dielectric layer, and a fourth conductive layer between the first dielectric substrate and the first substrate, where a pattern of the fourth conductive layer includes a seventh ground electrode, the feeding unit is on a side of the second dielectric substrate away from the second substrate, the radiating unit is on a side of the first dielectric substrate away from the first substrate, and an orthographic projection of the feeding unit on the first substrate does not overlap an orthographic projection of the radiating unit on the first substrate.

In a possible implementation, a third via is formed in the third conductive layer, a fourth via is formed in the fourth conductive layer, and an orthographic projection of the third via on the first substrate and an orthographic projection of the fourth via on the first substrate do not overlap each other.

In a third aspect, an embodiment of the present disclosure further provides an electronic apparatus, including:

the antennas as described in any one of the above embodiments, power dividing networks and feeding networks, which are in an array.

DETAIL DESCRIPTION OF EMBODIMENTS

Figure 1:
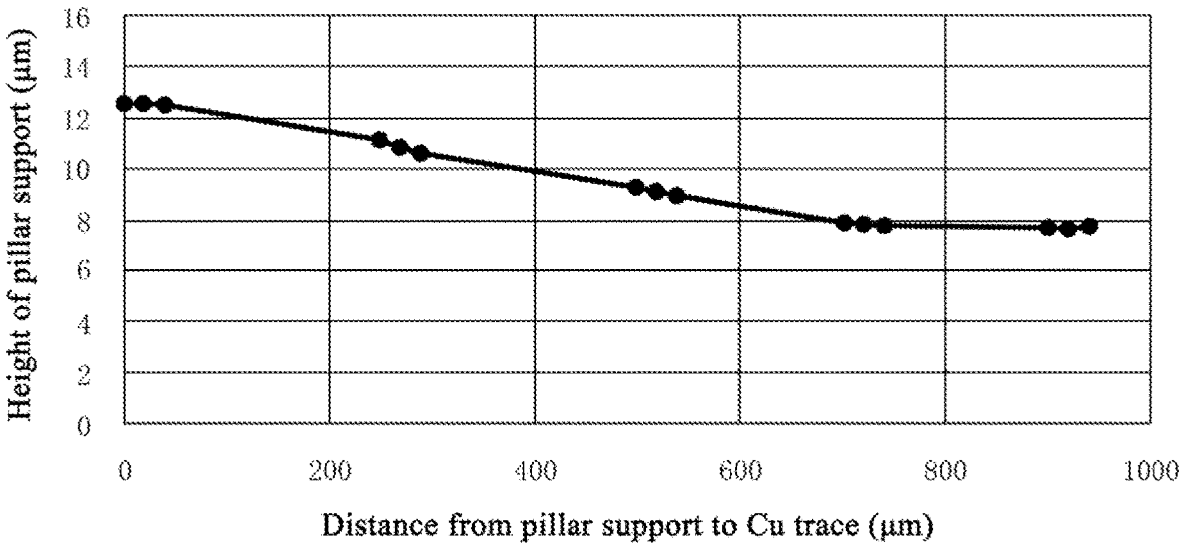
FIG. 1 is a schematic diagram illustrating a test of relationship between a height of a pillar support and a distance from the pillar support to a copper trace in a liquid crystal phase shifter according to the related art.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. Further, the embodiments of the present disclosure and features thereof may be combined with each other as long as they are not contradictory. All other embodiments obtained by those of ordinary skill in the art based on the embodiments of the present disclosure described herein without paying any creative effort shall be included in the protection scope of the present disclosure.

Unless otherwise defined, technical or scientific terms used in the present disclosure are intended to have general meanings as understood by those of ordinary skill in the art to which the present disclosure belongs. The words "include" or "comprise" or the like used in the present disclosure means that the element or item preceding the word contains elements or items that appear after the word or equivalents thereof, but does not exclude other elements or items.

It should be noted that the sizes and shapes of various components in the drawings are not to scale, but are merely intended to schematically illustrate the present disclosure. The same or similar reference signs refer to the same or similar elements or elements with the same or similar functions throughout the drawings.

In practical research, the inventors find according to capacitance calculation formula that a gap of an overlapping capacitor between an upper substrate and a lower substrate has a crucial influence on performance of a phase shifter. Combined with the layer structure of the liquid crystal phase shifter, uniformity of heights of pillar supports between the upper substrate and the lower substrate influences the uniformity of the gap of the overlapping capacitor to a great extent, and therefore the phase shifting performance is influenced.

In practical applications, a thickness of a metal layer corresponding to a transmission line or an electrode in the liquid crystal phase shifter is usually thicker, usually more than 2 μm. In this case, the height of the pillar support (PS) in the periphery of the transmission line or the electrode will be affected by the metal layer. As shown in FIG. 1, which is a schematic diagram illustrating a test of relationship between the height of the pillar support and a distance from the pillar support to a copper (Cu) trace, the closer the pillar support is from the Cu trace, the greater the height of the pillar support is. In a conventional case, when designing the pillar support, it is only ensured that no overlapped part occurs between the pillar support and the metal transmission line or the electrode, while this situation is not considered, so that the uniformity of the heights of the designed pillar supports is about 12.4%, and the uniformity is low, thereby reducing the phase shifting performance of the phase shifter.

In view of this, the embodiments of the present disclosure provide a phase shifter, an antenna, and an electronic apparatus, which can ensure uniformity of heights of pillar supports and improve phase shifting performance of the phase shifter.

Figure 2:
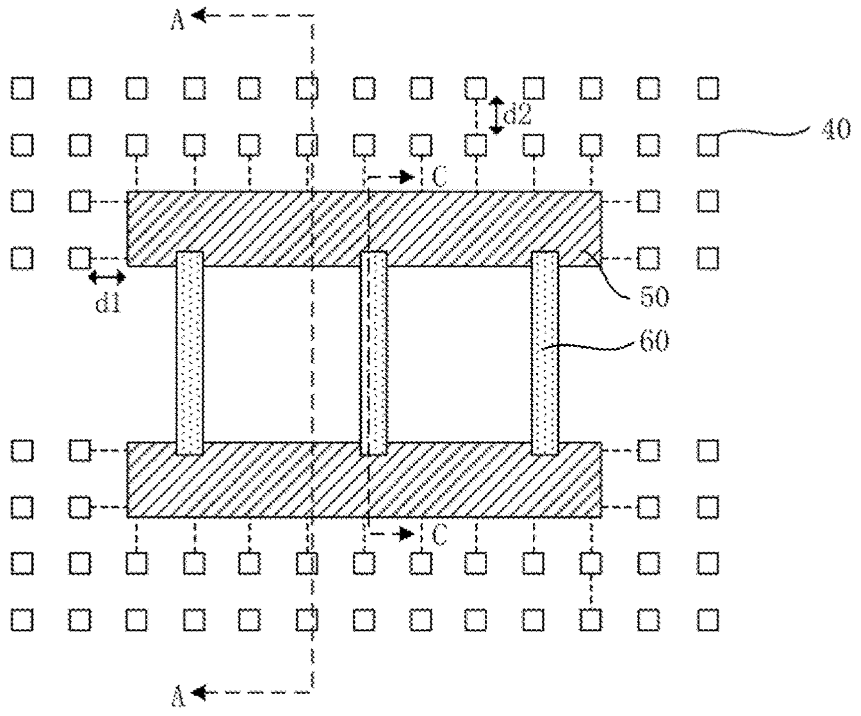
FIG. 2 is a schematic top view illustrating a structure of a phase shifter according to an embodiment of the present disclosure.
Figure 3:
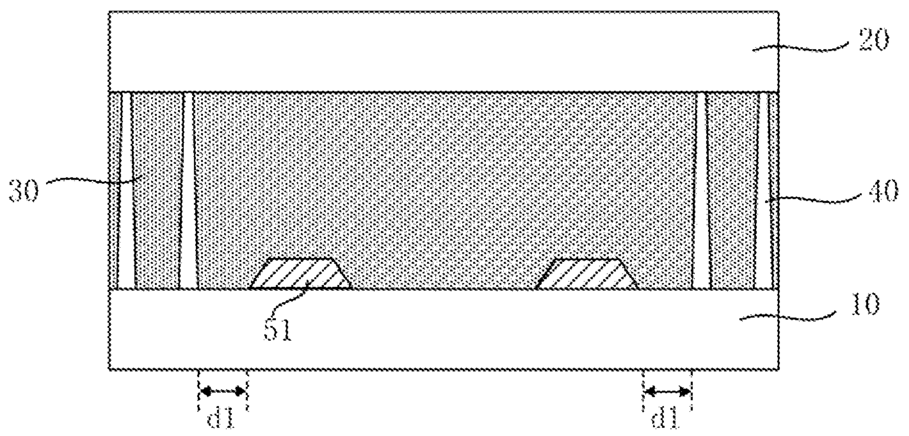
FIG. 3 is a schematic cross-sectional view illustrating a structure taken along a direction AA in FIG. 2.

FIG. 2 is a schematic top view illustrating a structure of a phase shifter according to an embodiment of the present disclosure, and FIG. 3 is a schematic cross-sectional view illustrating a structure taken along a direction AA in FIG. 2. Referring to FIGS. 2 and 3, the phase shifter includes:

- a first substrate 10 and a second substrate 20 disposed opposite to each other;

an adjustable dielectric layer 30 and a plurality of pillar supports 40, which are disposed between the first substrate 10 and the second substrate 20;

a first conductive layer 50 located on a side of the first substrate 10 close to the adjustable dielectric layer 30; and a second conductive layer 60 located on a side of the second substrate 20 close to the adjustable dielectric layer 30, where a pattern of the first conductive layer 50 includes at least one first electrode 51, a pattern of the second conductive layer 60 includes at least one second electrode 61, and an orthographic projection of the at least one first electrode 51 on the first substrate 10 at least partially overlaps an orthographic projection of the at least one second electrode 61 on the first substrate 10;

where an orthographic projection of each pillar support 40, which is located on the first substrate 10, on the first substrate 10 does not overlap an orthographic projection of the pattern of the first conductive layer 50 on the first substrate 10, and the pillar supports 40 of the plurality of pillar supports 40 close to an edge of the pattern of the first conductive layer 50 are disposed at equal distances from the edge of the pattern of the first conductive layer 50.

In a specific implementation process, the phase shifter according to an embodiment of the present disclosure includes a first substrate 10 and a second substrate 20 that are disposed opposite to each other, where each of the first substrate 10 and the second substrate 20 may be a glass substrate, a Polyimide (PI) substrate, or a Liquid Crystal Polymer (LCP) substrate. Alternatively, the first substrate 10 and the second substrate 20 may also be disposed according to practical application needs, which is not limited herein.

The phase shifter according to the embodiment of the present disclosure further includes an adjustable dielectric layer 30 and a plurality of pillar supports 40, disposed between the first substrate 10 and the second substrate 20. In one exemplary embodiment, the adjustable dielectric layer 30 may be a liquid crystal layer, and the corresponding phase shifter is a liquid crystal phase shifter. Liquid crystal molecules of the liquid crystal layer may be positive liquid crystal molecules, or negative liquid crystal molecules, which are not limited herein. The plurality of pillar supports 40 are further disposed between the first substrate 10 and the second substrate 20, so that a cell gap of the adjustable dielectric layer 30 is ensured.

The phase shifter according to the embodiment of the present disclosure further includes a first conductive layer 50 located on a side of the first substrate 10 close to the adjustable dielectric layer 30, and a second conductive layer 60 located on a side of the second substrate 20 close to the adjustable dielectric layer 30. In one exemplary embodiment, the first conductive layer 50 may be located on a surface of the first substrate 10 close to the adjustable dielectric layer 30, and the second conductive layer 60 may be located on a surface of the second substrate 20 close to the adjustable dielectric layer 30. The materials of the first conductive layer 50 and the second conductive layer 60 may be the same or different. For example, the material of the first conductive layer 50 may be Indium Tin Oxide (ITO), copper (Cu), silver (Ag), or the like, and the material of the second conductive layer 60 may be ITO, Cu, or Ag, or the like. Conductivities of different materials are different, and losses caused by different materials are different. In practical applications, the materials of the first conductive layer 50 and the second conductive layer 60 may be selected according to the requirements on the phase shifting degree of the phase shifter, which is not limited herein.

In a specific implementation process, the pattern of the first conductive layer 50 includes at least one first electrode 51, and the at least one first electrode 51 may be one first electrode or a plurality of first electrodes, which is not limited herein. The pattern of the second conductive layer 60 includes at least one second electrode 61, and the at least one second electrode 61 may be one second electrode or a plurality of second electrodes, which is not limited herein. In one exemplary embodiment, as shown in FIG. 2, the pattern of the first conductive layer 50 includes two transmission lines on which differential signals are transmitted, and accordingly, the at least one first electrode 51 may include two signal electrodes; the pattern of the second conductive layer 60 includes patch electrodes 610, and correspondingly, the at least one second electrode 61 includes three patch electrodes. Furthermore, an orthographic projection of at least one first electrode 51 of the first conductive layer 50 on the first substrate 10 at least partially overlaps an orthographic projection of at least one second electrode 61 on the first substrate 10, and accordingly, an adjustable capacitor is formed in a corresponding region where the orthographic projections overlap. In one exemplary embodiment, by applying different voltages to the corresponding electrodes of the adjustable capacitor, a vertical electric field is generated between the corresponding electrodes, so that liquid crystal molecules of the liquid crystal layer is driven to deflect, thereby changing a dielectric constant of the liquid crystal layer and further changing phase shifting degree of the phase shifter.

Still referring to FIGS. 2 and 3, an orthographic projection of each of the pillar supports 40, which are on the first substrate 10, on the first substrate 10 does not overlap the orthographic projection of the pattern of the first conductive layer 50 on the first substrate 10, and the pillar supports 40 of the plurality of pillar supports 40 close to the edge of the pattern of the first conductive layer 50 are disposed at equal distances from the edge of the pattern of the first conductive layer 50. That is, not only the pillar supports 40 on the first substrate 10 do not overlap the pattern of the first conductive layer 50, but also the pillar supports 40 are equally spaced apart from the edge of the corresponding pattern in the periphery of the pattern of the first conductive layer 50. Therefore, the uniformity of the heights of the pillar supports 40 is ensured, and the phase shifting performance of the phase shifter is improved. For example, the distance is set to be 800 μm or more. In one exemplary embodiment, the pillar supports 40 at the edge of the pattern of the first conductive layer 50 are spaced apart from the corresponding edge of the pattern by 900 μm. Alternatively, the distance between the pillar support 40 and the edge of the pattern of the first conductive layer 50 may also be set according to requirements on the practical application, and is not limited herein.

In an embodiment of the present disclosure, still referring to FIG. 2, the pillar supports 40 of the plurality of pillar supports 40 close to the edge of the pattern of the first conductive layer 50 are each spaced apart from the edge of the pattern of the first conductive layer 50 by a first distance, and any two adjacent pillar supports 40 of the plurality of pillar supports 40 are spaced apart from each other by a second distance, where the first distance is equal to the second distance. As shown in FIG. 2, d1 represents the first distance, d2 represents the second distance, and d1=d2. In this way, an even distribution of the pillar supports 40 is achieved, thereby ensuring a uniform cell gap of the phase shifter.

Figure 4:
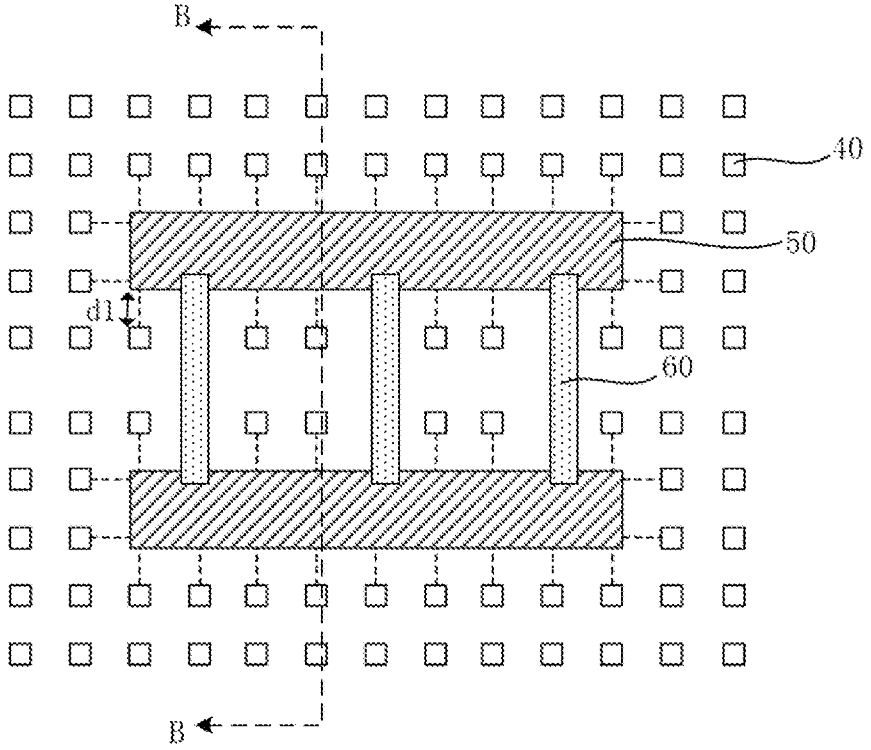
FIG. 4 is a schematic top view illustrating a structure of a phase shifter according to an embodiment of the present disclosure.
Figure 5:
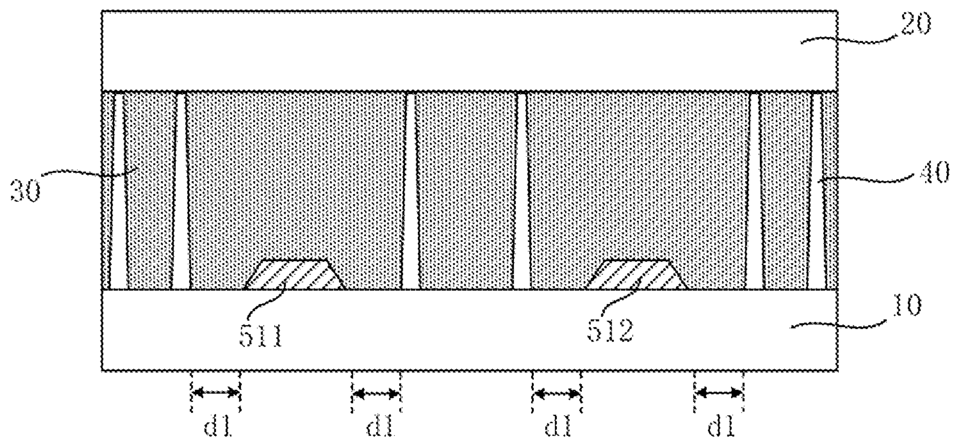
FIG. 5 is a schematic cross-sectional view illustrating a structure taken along a direction BB in FIG. 4.

In the embodiment of the present disclosure, reference is made to FIGS. 4 and 5, where FIG. 4 is a schematic top view illustrating a structure of a phase shifter according to the embodiment of the present disclosure, and FIG. 5 is a schematic cross-sectional view illustrating a structure taken along a direction BB in FIG. 4. The at least one first electrode 51 includes a first signal sub-electrode 511 and a second signal sub-electrode 512 which are spaced apart from each other, and some of the plurality of pillar supports 40 are disposed in a region between the first signal sub-electrode 511 and the second signal sub-electrode 512. Still referring to FIG. 4, the pillar supports 40 may be disposed not only between two signal sub-electrodes of the first substrate 10, but also between two adjacent second electrodes 61. In addition, the pillar supports 40 close to the edge of the pattern of the first conductive layer 50 may be disposed at equal intervals, so that the supporting strength of the pillar supports 40 to the phase shifter is improved while the uniformity of the heights of the pillar supports 40 is ensured.

Figure 6:
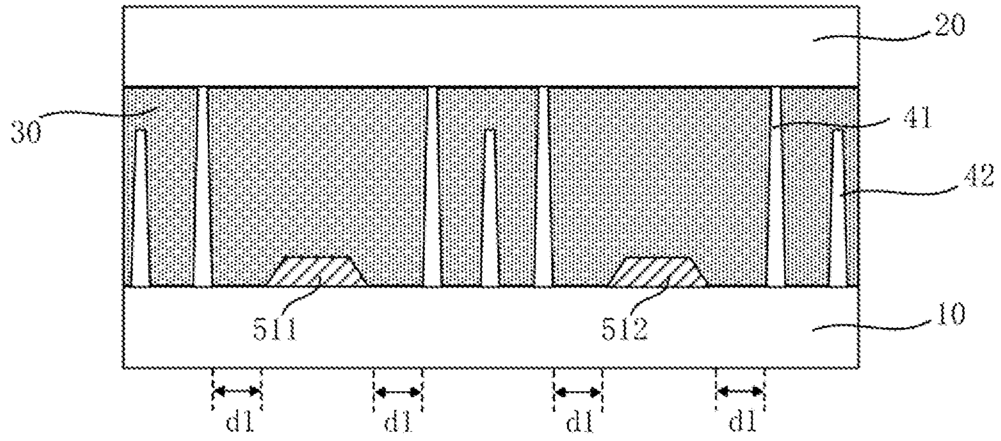
FIG. 6 is a schematic cross-sectional view illustrating a structure of a phase shifter according to an embodiment of the present disclosure.
Figure 7:
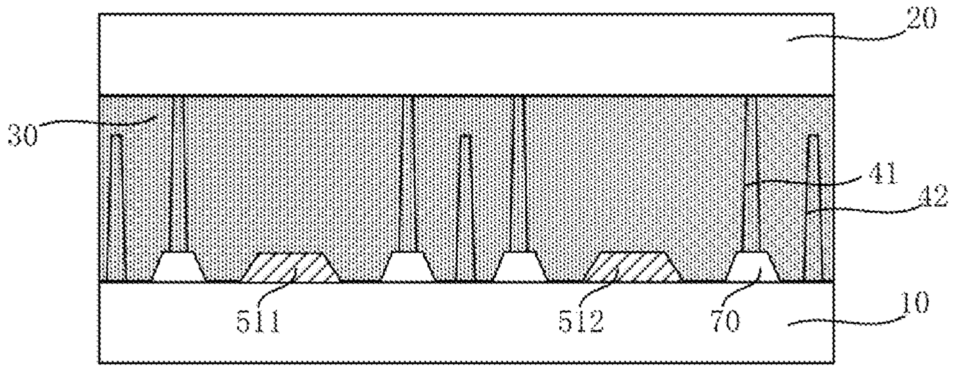
FIG. 7 is a schematic cross-sectional view illustrating a structure of a phase shifter according to an embodiment of the present disclosure.

In an embodiment of the present disclosure, as shown in FIGS. 6 and 7, the plurality of pillar supports 40 includes a plurality of main pillar supports 41 and a plurality of auxiliary pillar supports 42 that are disposed on the first substrate 10 at intervals. An end of each main pillar support 41 away from the first substrate 10 is disposed in contact with the second substrate 20, and an end of each auxiliary pillar support 42 away from the first substrate 10 is disposed in suspension. In a specific implementation process, the plurality of pillar supports 40 include a plurality of main pillar supports 41 and a plurality of auxiliary pillar supports 42 that are disposed on the first substrate 10 at intervals, and the specific number of the plurality of main pillar supports 41 and the plurality of auxiliary pillar supports 42 may be set according to requirements on the practical application, and is not limited herein. An end of each main pillar support 41 away from the first substrate 10 is disposed in contact with the second substrate 20, and an end of each auxiliary pillar support 42 away from the first substrate 10 is disposed in suspension.

In a specific implementation process, the main pillar support 41 may have the following configurations, but is not limited to the following configurations.

In one exemplary embodiment, still referring to FIG. 6, an end of each main pillar support 41 close to the first substrate 10 is disposed in contact with the first substrate 10, and an end of each auxiliary pillar support 42 away from the first substrate 10 is disposed in suspension, so that after the first substrate 10 and the second substrate 20 are aligned and assembled together, the main pillar supports 41 can be used to support the liquid crystal cell. When the liquid crystal cell is compressed due to external force extrusion or temperature change or other factors, the auxiliary pillar supports 42 can be utilized to support the liquid crystal cell in an auxiliary mode, so that the support capability of the pillar supports 40 is improved, and the uniformity of the cell gap of the liquid crystal phase shifter is maintained.

In one exemplary embodiment, as shown in FIG. 7, a padding layer 70 is disposed between an end of each of the main pillar supports 41 close to the first substrate 10 and the first substrate 10, and along a direction pointing from the first substrate 10 to the second substrate 20, a height of each of the main pillar supports is equal to a height of each of the auxiliary pillar supports 42. In this way, not only defects in the periphery of the pattern of the first conductive layer 50 can be filled through the padding layer 70, so that the stability of subsequent layer preparation is ensured, but also the height of each main pillar support 41 can be ensured to be equal to that of each auxiliary pillar support 42, so that the uniformity of the height of the pillar supports is ensured, the manufacturing efficiency of the pillar supports 40 is improved, and further the manufacturing efficiency of the phase shifter is improved. In one exemplary embodiment, a thickness of the padding layer 70 may be approximately equal to a thickness of the first electrode 51, or the thickness of the padding layer 70 may be slightly greater than the thickness of the first electrode 51, to ensure the flatness for the subsequent layer preparation, thereby improving the manufacturing efficiency of the phase shifter while ensuring the uniformity of the heights of the pillar supports.

It should be noted that, in the embodiments of the present disclosure, the related solution about the pillar support 40 is applicable to various phase shifter designs based on the liquid crystal overlapping capacitor, so that a process fluctuation of the capacitor gap is better controlled, and overall performance of the corresponding phase shifter is ensured. In a specific implementation process, the phase shifter according to the embodiment of the present disclosure may be a phase shifter with a double-line structure, and may alternatively be a phase shifter with a single-line structure.

Figure 8:
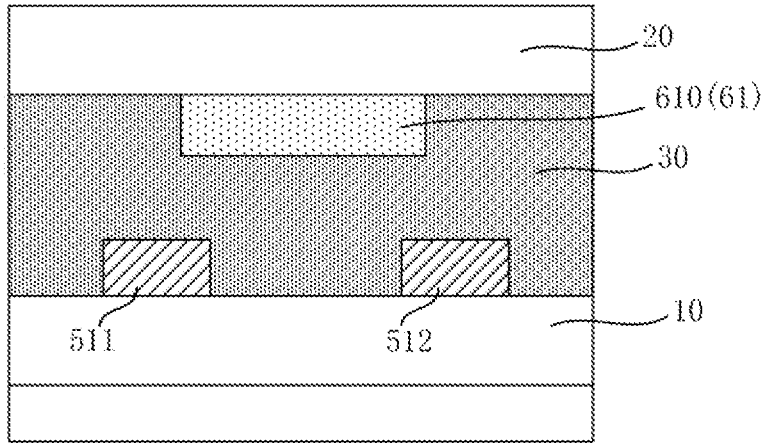
FIG. 8 is a schematic cross-sectional view illustrating a structure taken along a direction CC in FIG. 2.

For the phase shifter with the double-line structure, in an exemplary embodiment, as shown in FIG. 8, which is a schematic cross-sectional view illustrating a structure taken along a direction CC in FIG. 2, the at least one second electrode 61 includes a patch electrode 610 attached to a side of the second substrate 20 close to the adjustable dielectric layer 30. An orthographic projection of the first signal sub-electrode 511 on the first substrate 10 at least partially overlaps an orthographic projection of the patch electrode 610 on the first substrate 10, and an orthographic projection of the second signal sub-electrode 512 on the first substrate 10 at least partially overlaps the orthographic projection of the patch electrode 610 on the first substrate 10. In one exemplary embodiment, the patch electrode 610 may be attached to a surface of the second substrate 20 close to the adjustable dielectric layer 30. Still referring to FIG. 8, in each of an overlapping region between the first signal sub-electrode 511 and the patch electrode 610 and an overlapping region between the second signal sub-electrode 512 and the patch electrode 610, an adjustable capacitor is formed. In addition, as shown in FIG. 8, a ground electrode is further disposed on a surface of the first substrate 10 away from the adjustable dielectric layer 30, to provide a ground reference for the first signal sub-electrode 511 and the second signal sub-electrode 512, so that a microstrip-like transmission line structure is formed.

Figure 9:
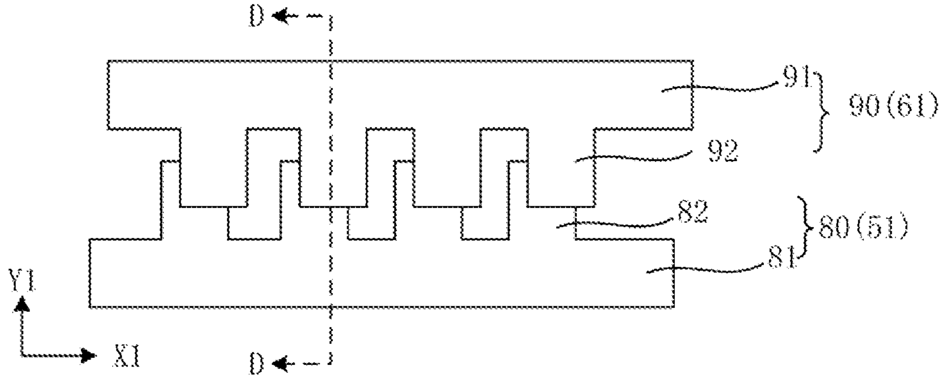
FIG. 9 is a schematic top view illustrating a structure of a phase shifter according to an embodiment of the present disclosure.
Figure 10:
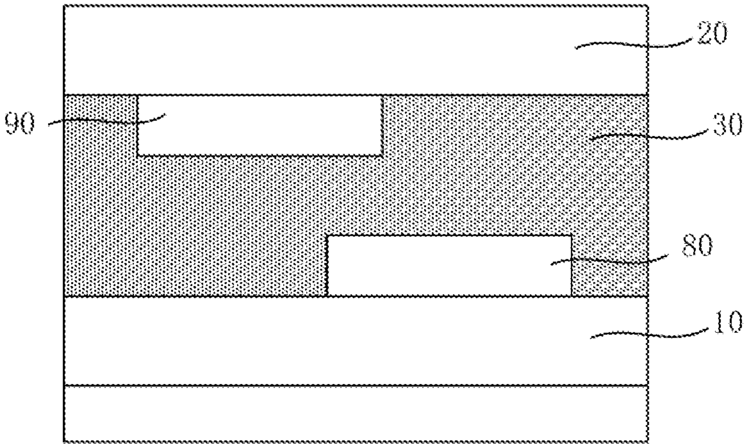
FIG. 10 is a schematic cross-sectional view illustrating a structure taken along a direction DD in FIG. 9.

For the phase shifter with the double-line structure, in one exemplary embodiment, see FIGS. 9 and 10, where FIG. 9 is a schematic top view illustrating a structure of a phase shifter, not showing the pillar supports; and FIG. 10 is a schematic cross-sectional view illustrating a structure taken along a direction DD in FIG. 9. Specifically, the at least one first electrode 51 includes a first signal electrode 80, and the at least one second electrode 61 includes a second signal electrode 90. The first signal electrode 80 includes a first main part 81 extending in a first direction, and a plurality of first branch parts 82 each connected to the first main part 81 and extending in a second direction intersecting the first direction.

The second signal electrode 90 includes a second main part 91 extending in the first direction, and a plurality of second branch parts 92 each connected to the second main part 91 and extending in the second direction. An orthographic projection of the first branch part 82 on the first substrate 10 at least partially overlaps an orthographic projection of a corresponding second branch part 92 on the first substrate 10.

Still referring to FIGS. 9 and 10, the at least one first electrode 51 includes a first signal electrode 80, the at least one second electrode 61 includes a second signal electrode 90, and the first signal electrode 80 includes a first main part 81 extending in a first direction, which is indicated by an arrow X1 in FIG. 9, and a plurality of first branch parts 82 each connected to the first main part 81 and extending in a second direction intersecting the first direction, the second direction being indicated by an arrow Y1 in FIG. 9. The number of the first branch parts 82 may be set according to practical requirements on the phase shifting degree of the phase shifter, and is not limited herein. In addition, the second signal electrode 90 includes a second main part 91 extending in the first direction, and a plurality of second branch parts 92 each connected to the second main part 91 and extending in the second direction. The number of the second branch parts 92 may be set according to practical requirements on the phase shifting degree of the phase shifter. The orthographic projection of the first branch part 82 on the first substrate 10 at least partially overlaps the orthographic projection of the corresponding second branch part 92 on the first substrate 10, so that a corresponding adjustable capacitor may be formed in the overlapping region between the first branch part 82 and the second branch part 92, thereby ensuring the phase shifting performance of the phase shifter. In practical applications, the number of the first branch parts 82 and the second branch parts 92 and an area of the overlapping region between the two branch parts may be set according to practical requirements on the phase shifting degree of the phase shifter, which will not be described in detail herein.

Figure 11:
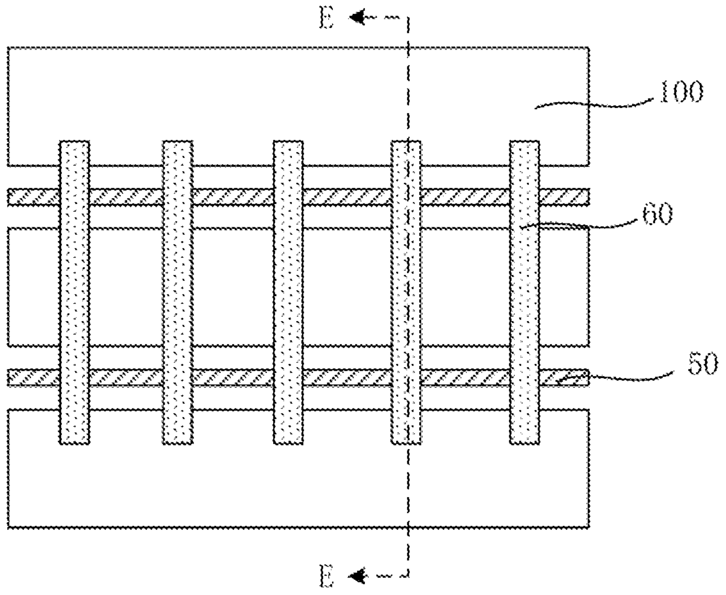
FIG. 11 is a schematic top view illustrating a structure of a phase shifter according to an embodiment of the present disclosure.
Figure 12:
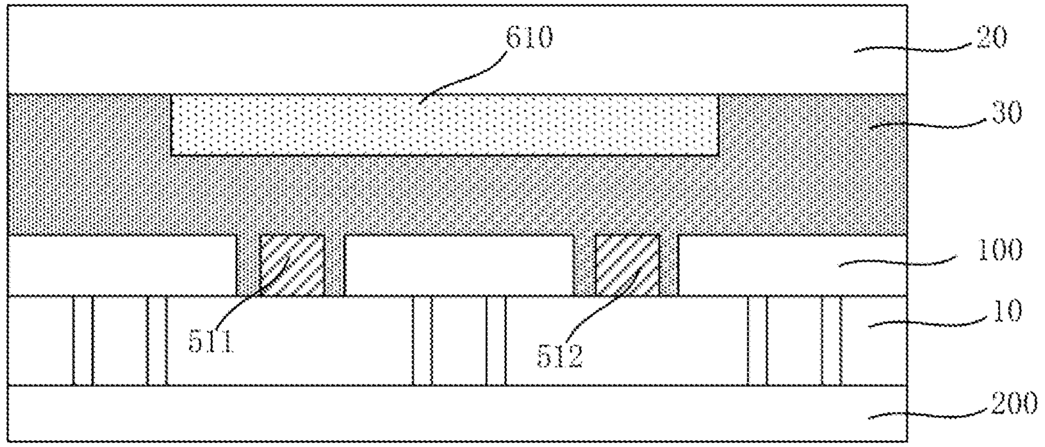
FIG. 12 is a schematic cross-sectional view illustrating a structure taken along a direction EE in FIG. 11.

For the phase shifter with the double-line structure, in one exemplary embodiment, see FIGS. 11 and 12, where FIG. 11 is a schematic top view illustrating a structure of a phase shifter, not showing the pillar supports; and FIG. 12 is a schematic cross-sectional view illustrating a structure taken along a direction EE in FIG. 11. Specifically, the at least one first electrode 51 further includes a plurality of first ground electrodes 100 disposed at intervals on a side of the first substrate 10 close to the adjustable dielectric layer 30. Each of the first ground electrodes 100 is connected to a second ground electrode 200 disposed on a side of the first substrate 10 away from the adjustable dielectric layer 30 through a via penetrating through the first substrate 10. An orthographic projection of each of the first ground electrodes 100 on the first substrate 10 is completely within an orthographic projection of the second ground electrode 200 on the first substrate 10, and the orthographic projection of each of the first ground electrodes 100 on the first substrate 10 at least partially overlaps an orthographic projection of the patch electrode 610 on the first substrate 10.

Still referring to FIGS. 11 and 12, in addition to a first signal sub-electrode 511 and a second signal sub-electrode 512 spaced apart from each other, the at least one first electrode 51 further includes a plurality of first ground electrodes 100 spaced apart from each other on a side of the first substrate 10 close to the adjustable dielectric layer 30. In one exemplary embodiment, each of the first ground electrodes 100 may be located on a surface of the first substrate 10 close to the adjustable dielectric layer 30. Each first ground electrode 100 is electrically connected to the second ground electrode 200 disposed on the side of the first substrate 10 away from the adjustable dielectric layer 30 through a via e penetrating through the first substrate 10, to provide a ground reference for the first signal sub-electrode 511 and the second signal sub-electrode 512, so that a microstrip-like transmission line structure is formed. In addition, the orthographic projection of each first ground electrode 100 on the first substrate 10 is completely within the orthographic projection of the second ground electrode 200 on the first substrate 10, thereby improving the usability of the phase shifter. Moreover, in addition to that the first signal sub-electrode 511 and the patch electrode 610 forms an adjustable capacitor in the overlapping region, and the second signal sub-electrode 512 and the patch electrode 610 forms an adjustable capacitor in the overlapping region, since the orthographic projection of each first ground electrode 100 on the first substrate 10 at least partially overlaps the orthographic projection of the patch electrode 610 on the first substrate 10, so that an adjustable capacitor can also be formed in the overlapping region between each first ground electrode 100 and the patch electrode 610, thereby ensuring the phase shifting performance of the phase shifter.

Figure 13:
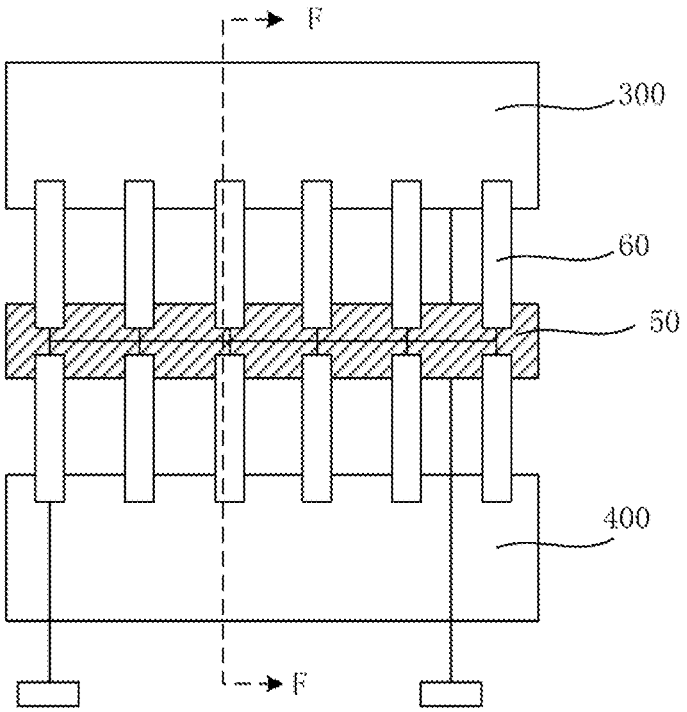
FIG. 13 is a schematic top view illustrating a structure of a phase shifter according to an embodiment of the present disclosure.
Figure 14:
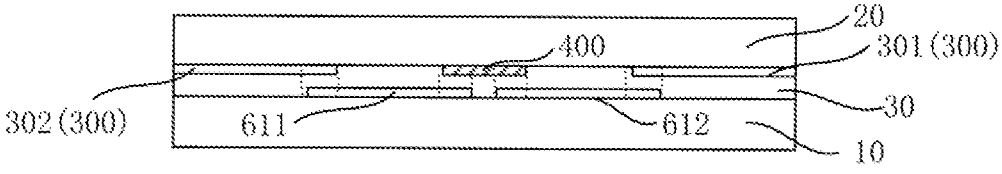
FIG. 14 is a schematic cross-sectional view illustrating a structure taken along a direction FF in FIG. 13.

For the phase shifter with the single-line structure, it may be a phase shifter with a Coplanar Waveguide (CPW) structure, in one exemplary embodiment as shown in FIGS. 13 and 14, where FIG. 13 a schematic top view illustrating a structure of a phase shifter, and FIG. 14 a schematic cross-sectional view illustrating a structure taken along a direction FF in FIG. 13. Specifically, the at least one first electrode 51 includes a first patch sub-electrode 611 and a second patch sub-electrode 612 which are attached to a surface of the first substrate 10 close to the adjustable dielectric layer 30 and are spaced apart from each other. The at least one second electrode 61 includes a third ground electrode 300 and a third signal electrode 400. The third ground electrode 300 includes a first ground sub-electrode 301 and a second ground sub-electrode 302 which are spaced apart from each other. The third signal electrode 400 is located between the first ground sub-electrode 301 and the second ground sub-electrode 302. An orthographic projection of the third signal electrode 400 on the first substrate 10 partially overlaps an orthographic projection of the first patch sub-electrode 611 on the first substrate 10, and partially overlaps an orthographic projection of the second patch sub-electrode 612 on the first substrate 10. A plurality of pillar supports 40 are disposed in a region between the third ground electrode 300 and the first substrate 10.

Still referring to FIGS. 13 and 14, the at least one first electrode 51 includes a first patch sub-electrode 611 and a second patch sub-electrode 612 which are attached to the side of the first substrate 10 close to the adjustable dielectric layer 30 and are spaced apart from each other; the at least one second electrode 61 includes a third ground electrode 300 and a third signal electrode 400, the third ground electrode 300 includes a first ground sub-electrode 301 and a second ground sub-electrode 302 which are spaced apart from each other, and the third signal electrode 400 is located between the first ground sub-electrode 301 and the second ground sub-electrode 302 without overlapping each other. In one exemplary embodiment, the signal electrode and the ground electrode may be both located on the surface of the second substrate 20 close to the adjustable dielectric layer 30, and accordingly, the phase shifter structure may be a waveguide-based coplanar phase shifter. In addition, the orthographic projection of the third signal electrode 400 on the first substrate 10 partially overlaps the orthographic projection of the first patch sub-electrode 611 on the first substrate 10, and partially overlaps the orthographic projection of the second patch sub-electrode 612 on the first substrate 10. In this case, an adjustable capacitor may be formed in an overlapping region between the third signal electrode 400 and the first patch sub-electrode 611, and an adjustable capacitor may also be formed in an overlapping region between the third signal electrode 400 and the second patch sub-electrode 612. In addition, the orthographic projection of the first ground sub-electrode 301 on the first substrate 10 may partially overlap the orthographic projection of the first patch sub-electrode 611 on the first substrate 10, the orthographic projection of the second ground sub-electrode 302 on the first substrate 10 may partially overlap the orthographic projection of the second patch sub-electrode 612 on the first substrate 10, accordingly, an adjustable capacitor may also be formed in an overlapping region between the first ground sub-electrode 301 and the first patch sub-electrode 611, and an adjustable capacitor may also be formed in an overlapping region between the second ground sub-electrode 302 and the second patch sub-electrode 612, so that the phase shifting performance of the phase shifter is ensured.

Figure 15:
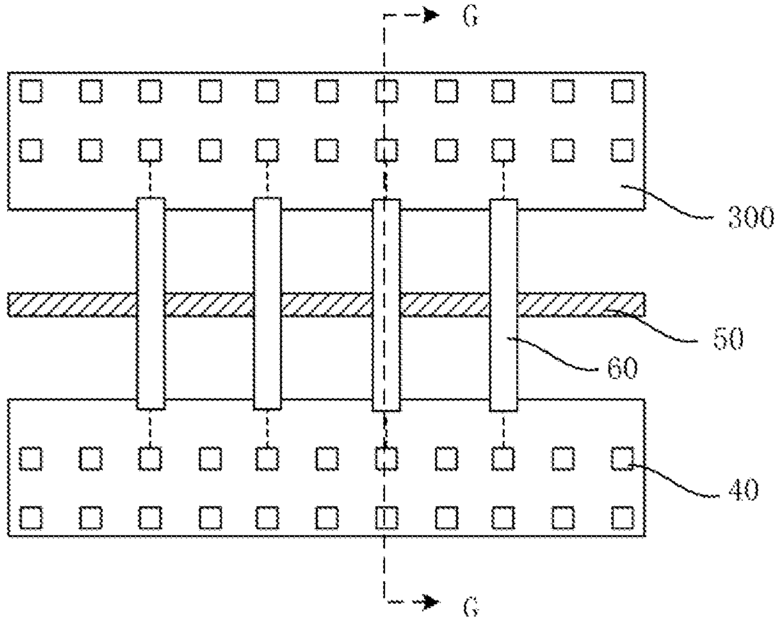
FIG. 15 is a schematic top view illustrating a structure of a phase shifter according to an embodiment of the present disclosure.
Figure 16:
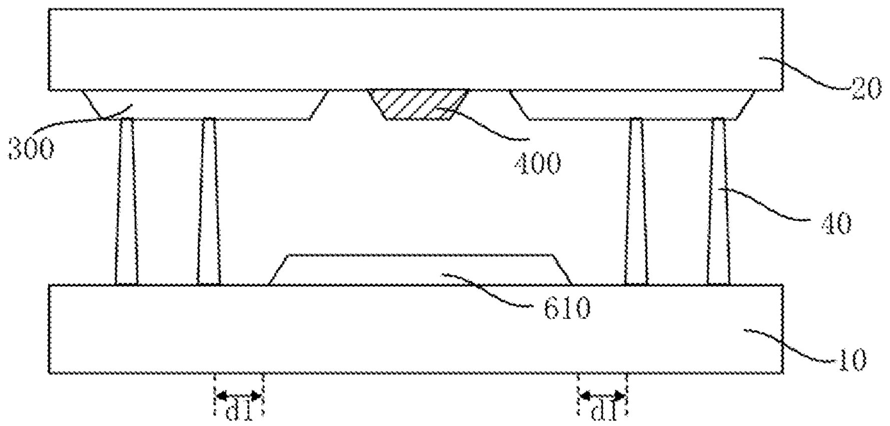
FIG. 16 is a schematic cross-sectional view illustrating a structure taken along a direction GG in FIG. 15.

For the phase shifter with the single-line structure, in one exemplary embodiment, when an area of an orthographic projection of the third ground electrode 300 on the first substrate 10 is larger, the pillar supports 40 may be disposed in a region between the third ground electrode 300 and the first substrate 10. Accordingly, the distribution of the pillar supports 40 may be as shown in FIGS. 15 and 16, wherein FIG. 15 is a schematic top view illustrating a structure of a phase shifter, and FIG. 16 is a schematic cross-sectional view illustrating a structure taken along a direction GG in FIG. 15.

Figure 17:
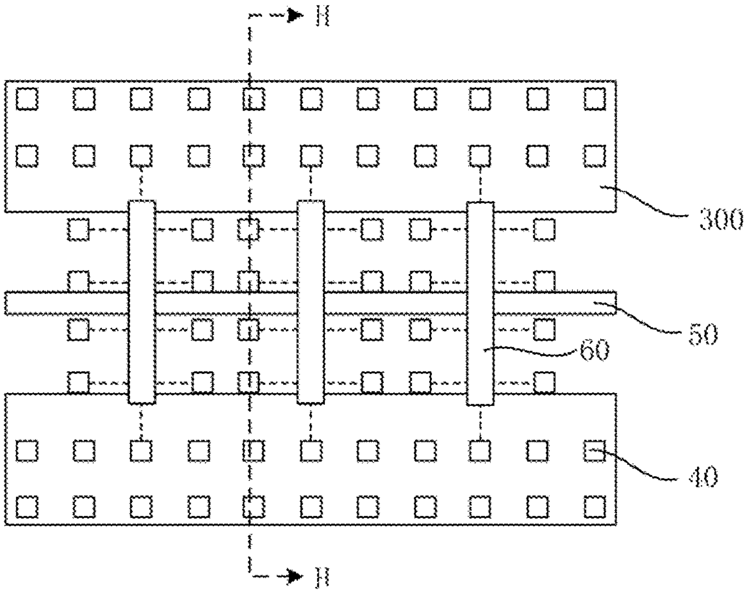
FIG. 17 is a schematic top view illustrating a structure of a phase shifter according to an embodiment of the present disclosure.
Figure 18:
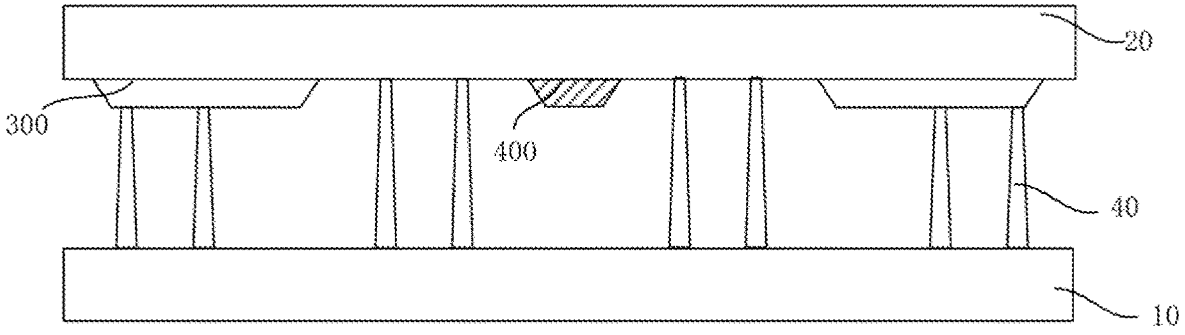
FIG. 18 is a schematic cross-sectional view illustrating a structure taken along a direction HH in FIG. 17.

For the phase shifter with the single-line structure, in one exemplary embodiment, see FIGS. 17 and 18, where FIG. 17 is a schematic top view illustrating a structure of a phase shifter, and FIG. 18 is a schematic cross-sectional view illustrating a structure taken along a direction HH in FIG. 17. Specifically, the plurality of pillar supports 40 are disposed in a region between the third ground electrode 300 and the third signal electrode 400, which improves the support performance of the phase shifter.

Figure 19:
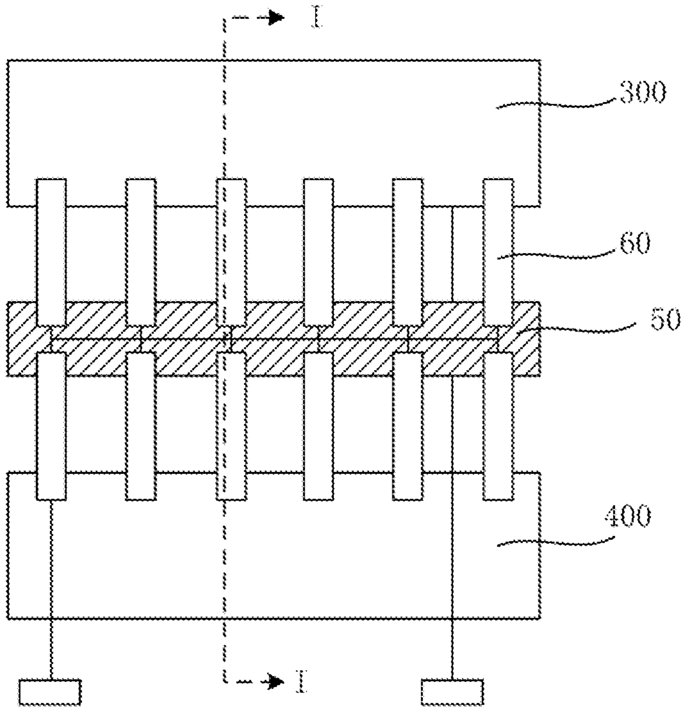
FIG. 19 is a schematic top view illustrating a structure of a phase shifter according to an embodiment of the present disclosure.
Figure 20:
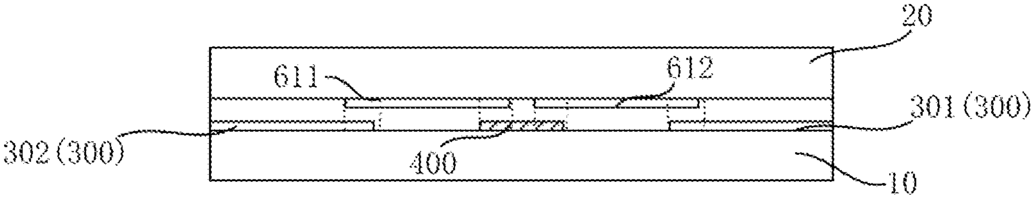
FIG. 20 is a schematic cross-sectional view illustrating a structure taken along a direction II in FIG. 19.

For the phase shifter with the single-line structure, in one exemplary embodiment, see in FIGS. 19 and 20, where FIG. 19 is a schematic top view illustrating a structure of a phase shifter, and FIG. 20 is a schematic cross-sectional view illustrating a structure taken along a direction II in FIG. 19. Specifically, a first patch sub-electrode 611 and a second patch sub-electrode 612 may be disposed on a surface of the second substrate 20 close to the adjustable dielectric layer 30, and a third ground electrode 300 and a third signal electrode 400 may be disposed on a surface of the first substrate 10 close to the adjustable dielectric layer 30. It should be noted that, a first driving voltage may alternatively be input through the first driving line, and the first ground sub-electrode 301, the second ground sub-electrode 302, and the third signal electrode 400 may alternatively be connected in series as a low-frequency equipotential body through a second driving line. A second driving voltage may alternatively be input through a third driving line, and the first patch sub-electrode 611 and the second patch sub-electrode 612 may alternatively be connected in series as a low frequency equipotential body through a fourth driving line.

Figure 21:
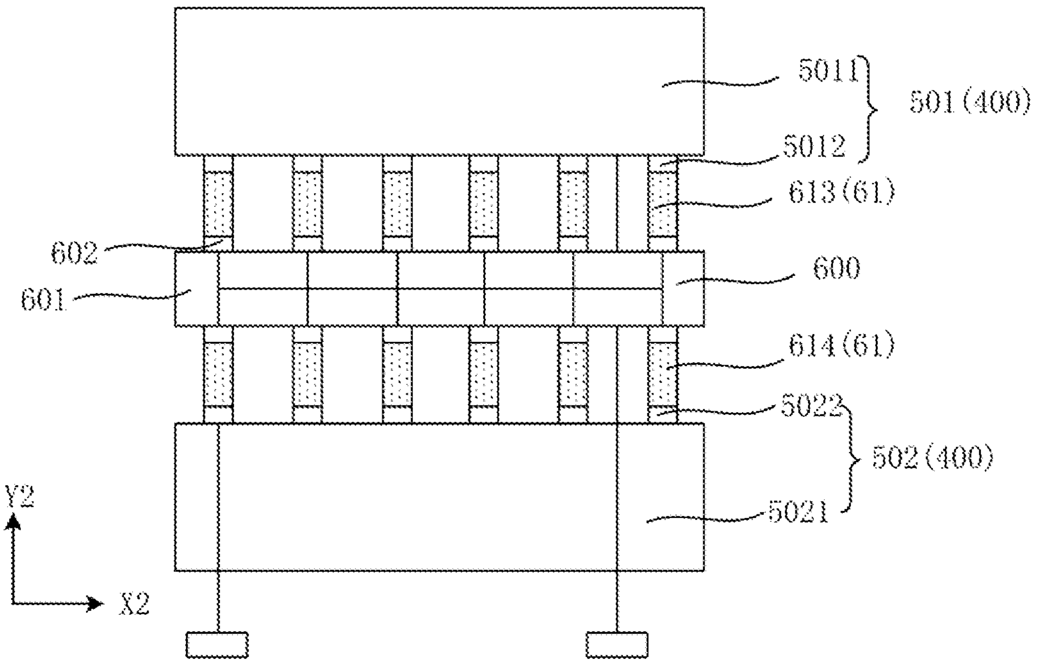
FIG. 21 is a schematic top view illustrating a structure of a phase shifter according to an embodiment of the present disclosure.
Figure 22:
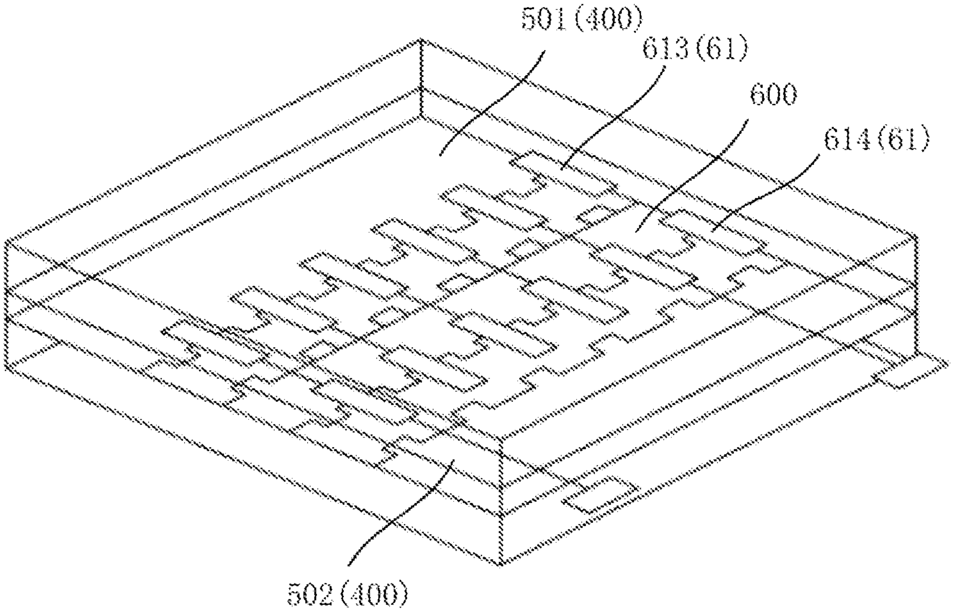
FIG. 22 is a schematic perspective view illustrating a structure corresponding to FIG. 21.

For the phase shifter with the single-line structure, in one exemplary embodiment, see FIGS. 21 and 22, where FIG. 21 is a schematic top view illustrating a structure of a phase shifter, and FIG. 22 is a schematic perspective view illustrating a structure corresponding to FIG. 21. Specifically, the at least one second electrode 61 includes a third patch sub-electrode 613 and a fourth patch sub-electrode 614 attached to a side of the second substrate 20 close to the adjustable dielectric layer 30 and are spaced apart from each other. In one exemplary embodiment, the third patch sub-electrode 613 and the fourth patch sub-electrode 614 are each attached to a surface of the second substrate 20 close to the adjustable dielectric layer 30. The at least one first electrode 51 includes a fourth ground electrode 400 and a fourth signal electrode 600. The fourth ground electrode 400 includes a third ground sub-electrode 501 and a fourth ground sub-electrode 502 which are disposed at an interval. The fourth signal electrode 600 is located between the third ground sub-electrode 501 and the fourth ground sub-electrode 502. The third ground sub-electrode 501 includes a third main part 5011 extending in a third direction and a plurality of third branch parts 5012 each connected to the third main part 5011 and extending in a fourth direction intersecting the third direction. The fourth ground sub-electrode 502 includes a fourth main part 5021 extending in the third direction and a plurality of fourth branch parts 5022 each connected to the fourth main part 5021 and extending in the fourth direction. An orthographic projection of the third branch part 5012 on the first substrate 10 at least partially overlaps an orthographic projection of the third patch sub-electrode 613 on the first substrate 10, and an orthographic projection of the fourth branch part 5022 on the first substrate 10 at least partially overlaps an orthographic projection of the fourth patch electrode on the first substrate 10. The fourth signal electrode 600 includes a fifth main part 601 extending in the third direction, and a plurality of fifth branch parts 602 each connected to the fifth main part 601 and extending in the fourth direction. An orthographic projection of the fifth branch parts 602 on the first substrate 10 at least partially overlaps the orthographic projections of the third patch sub-electrode 613 and the fourth patch sub-electrode 614 on the first substrate 10.

Still referring to FIGS. 21 and 22, the third direction is shown as arrow X2 in FIG. 21, and the fourth direction is shown as arrow Y2 in FIG. 21. The third ground sub-electrode 501 in the fourth ground electrode 400 has a plurality of tunable third branches 5012, the fourth ground sub-electrode 502 in the fourth ground electrode 400 has a plurality of tunable fourth branches 5022, and the fourth signal electrode 600 has a plurality of tunable fifth branches 602. Not only an adjustable capacitor may be formed by the partial overlapping of the third patch sub-electrode 613 with the corresponding third branch 5012 and fifth branch 602, but also an adjustable capacitor may be formed by the partial overlapping of the fourth patch sub-electrode 614 with the corresponding fourth branch 5022 and fifth branch 602, thereby ensuring the phase shifting performance of the phase shifter.

Figure 23:
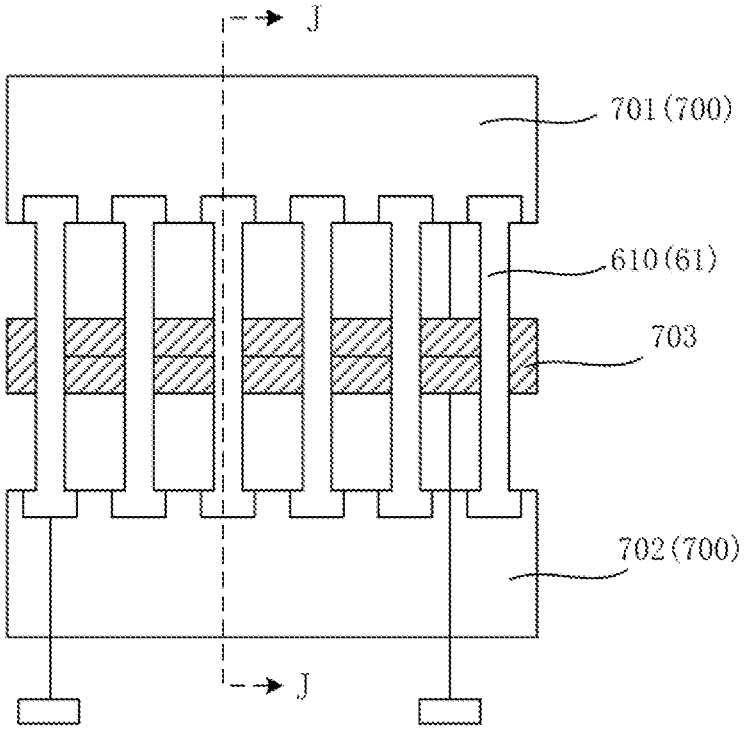
FIG. 23 is a schematic top view illustrating a structure of a phase shifter according to an embodiment of the present disclosure.
Figure 24:
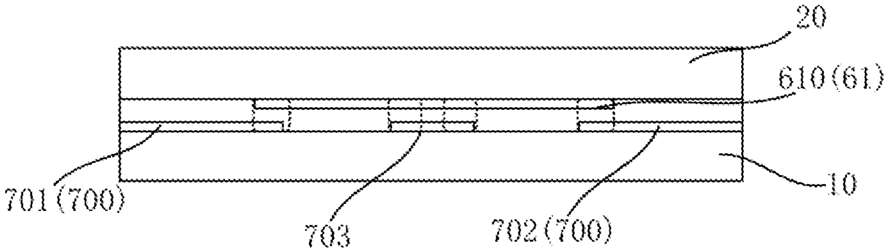
FIG. 24 is a schematic cross-sectional view illustrating a structure taken along a direction JJ in FIG. 23.

For the phase shifter with the single-line structure, in one exemplary embodiment, see FIGS. 23 and 24, where FIG. 23 is a schematic top view illustrating a structure of a phase shifter, and FIG. 24 is a schematic cross-sectional view illustrating a structure taken along a direction JJ in FIG. 23. Specifically, the at least one second electrode 61 includes a patch electrode 610 attached to a side of the second substrate 20 close to the adjustable dielectric layer 30. The at least one first electrode 51 includes a fifth ground electrode 700 and a fifth signal electrode 703. The fifth ground electrode 700 includes a fifth ground sub-electrode 701 and a sixth ground sub-electrode 702 which are spaced apart from each other. The fifth signal electrode 703 is located between the fifth ground sub-electrode 701 and the sixth ground sub-electrode 702, and an orthographic projection of the fifth signal electrode 703 on the first substrate 10 is completely within an orthographic projection of the patch electrode 610 on the first substrate 10.

Still referring to FIGS. 23 and 24, the orthographic projection of the fifth signal electrode 703 disposed on the surface of the first substrate 10 close to the adjustable dielectric layer 30 on the first substrate 10 is completely within the orthographic projection of the patch electrode 610 attached on the surface of the second substrate 20 close to the adjustable dielectric layer 30 on the first substrate 10, so that an adjustable capacitor may be formed in the overlapping region between the patch electrode 610 and the fifth signal electrode 703. In addition, for the fifth ground sub-electrode 701 and the sixth ground sub-electrode 702 of the fifth ground electrode 700 provided on the surface of the first substrate 10 close to the adjustable dielectric layer 30, the orthographic projection of the fifth ground sub-electrode 701 on the first substrate 10 partially overlaps the orthographic projection of the patch electrode 610 on the first substrate 10, so that an adjustable capacitor may be formed in the overlapping region between the fifth ground sub-electrode 701 and the patch electrode 610; the orthographic projection of the sixth ground sub-electrode 702 on the first substrate 10 partially overlaps the orthographic projection of the patch electrode 610 on the first substrate 10, so that an adjustable capacitor may be formed in the overlapping region between the sixth ground sub-electrode 702 and the patch electrode 610. Therefore, the phase shifting performance of the phase shifter is ensured.

In the embodiment of the present disclosure, in addition to the related layers mentioned above, the phase shifter may further include a passivation layer for ensuring an insulation between the adjacent electrodes, an alignment layer may be further disposed on a side of the adjustable dielectric layer 30 close to the first substrate 10, and an alignment layer may be further disposed on a side of the adjustable dielectric layer 30 close to the second substrate 20. In one exemplary embodiment, the alignment layer may be a Polyimide (PI) film. The passivation layer may be made of silicon nitride (SiN) or silicon oxide (SiO), which is not limited herein. In the case that the adjustable dielectric layer 30 in the phase shifter is a liquid crystal, the liquid crystal molecules in the liquid crystal may be tilted at a predetermined angle by a preset alignment layer. In this way, after the driving voltage is applied to the relevant electrode, the adjustment efficiency of the dielectric constant of the liquid crystal is improved, thereby improving the phase shifting efficiency. Alternatively, other layers of the phase shifter may be disposed according to the practical application, and reference may be made to the specific arrangement in the related art, which will not be described in detail herein.

In addition, the phase shifter in the embodiment of the present disclosure may be manufactured as follows. For the preparation process of the relevant layer on the first substrate 10, firstly, an Al/Mo metal layer is deposited on the first substrate 10 by Physical Vapor Deposition (PVD). Then, a specific mask serving as a mark in a subsequent process is formed by combining a photomask with a special pattern with an etching process. Then, a SiNx layer is formed on the above-described layer by Chemical Vapor Deposition (CVD), where the dielectric constant of the SiNx layer is controlled to be in a range of 2 to 4, to reduce the influence on the phase shifting degree and insertion loss of the phase shifter. Then, an ITO layer is deposited to form driving traces each with a line width of 10 μm and with a line spacing of 5 μm; in addition, the driving traces may alternatively be an array of conductive lines formed from a MoNb/Cu layer, and may form an Active Matrix (AM) driving array layer by combining with Thin Film Transistor (TFT) devices.

Then, a transmission line layer is formed on the above-described layer through an electroplating process, where a whole seed layer is formed through PVD (physical vapor deposition), a patterned PhotoResist (PR) is formed on the seed layer, the PR may be slightly higher than a height of a required metal layer, then the patterned metal layer is grown in a place where the PR is not formed through electroplating, and finally the PR is stripped and the seed layer is etched, so that the transmission line layer with the required pattern is formed. Then, a negative stress layer may be deposited on the above-described layer, and the negative stress layer may be made of SiNx, so that the internal stress caused by the excessively thick metal transmission line layer is relieved, and the effect of protecting the metal layer is achieved, and the chemical reaction caused by contact of the metal layer with liquid crystal or air is prevented. Then, the pillar supports 40 are formed, the pillar supports may be formed on the first substrate 10 in a space not overlapping the metal transmission lines or the electrodes, a PS (Photo Spacer, a photoresist)/OC (Overcoat, a photosensitive resin) material may be used, and the cross-sectional shape of the pillar support 40 may be square, circular, or the like. The pillar supports 40 in the periphery of the metal transmission lines or the electrodes are disposed at equal intervals, being spaced apart from the edge of the metal by 800 μm or more. After the pillar supports 40 are prepared, a PI (Polyimide) layer is uniformly laid on the above-described layer by using an inkjet process, and then an optical alignment process of the PI layer is completed with OA (Optical Alignment) apparatus. Accordingly, similar processes may be used to prepare other layers on the second substrate 20 besides the pillar supports 40, and the detailed processes are not described in detail. Then, a seal is coated in the periphery of the device, liquid crystal is dripped thereinto, and a cell alignment is performed, to complete the preparation of the whole device. Alternatively, a seal may be coated in the periphery of the device, liquid crystal is filled into a cell after the cell is aligned and assembled, to complete the preparation of the whole device.

Figure 25:
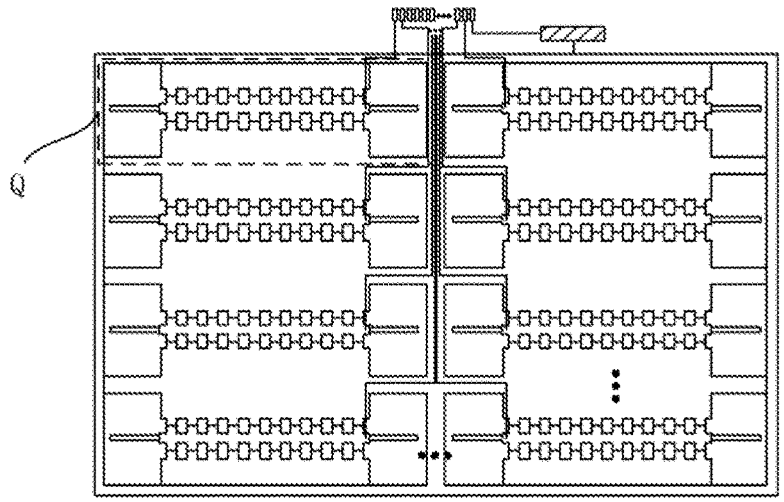
FIG. 25 is a schematic a top view illustrating an array of phase shifters according to an embodiment of the present disclosure.

It should be noted that, based on the phase shifters according to the embodiments of the present disclosure, a plurality of phase shifters arranged in an array may constitute a phase shifter array as shown in FIG. 25. A region Q represents a phase shifter. In a specific implementation process, each phase shifter in the phase shifter array may be a CPW-based coplanar phase shifter, and alternatively, may also be a CPW-based non-coplanar phase shifter. For the coplanar phase shifter, the signal electrode and the ground electrode are located on a same surface of a same substrate, i.e., on a same side of an interior of the adjustable dielectric layer 30, and overlapping electrode pieces overlap the signal electrode and the ground electrode, respectively, to form an area of orthographic projections overlapping region, thereby forming an adjustable capacitor. For the non-coplanar phase shifter, the signal electrode and the ground electrode are located on two sides of the interior of the adjustable dielectric layer 30, the overlapping electrode pieces are formed by the extension branches of the signal electrode and/or the ground electrode, and an area of orthographic projections overlapping region is formed, so that an adjustable capacitor is formed.

Figure 26:
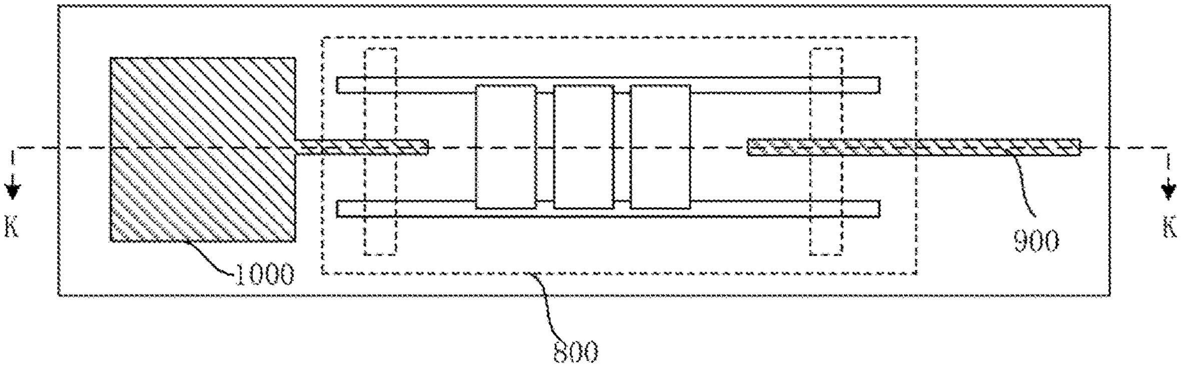
FIG. 26 is a schematic top view illustrating a structure of an antenna according to an embodiment of the present disclosure.

Based on the same disclosure concept, as shown in FIG. 26, an embodiment of the present disclosure provides an antenna, including:

the phase shifter 800 as described above; and a feeding unit 900 and a radiating unit 1000 each coupled to the phase shifter 800, where the feeding unit 900 is configured to couple a received radio frequency signal to the phase shifter 800, and the phase shifter 800 is configured to shift a phase of the radio frequency signal to obtain a phase-shifted signal, and couple the phase-shifted signal to the radiating unit 1000, so that the radiating unit 1000 radiates an electromagnetic wave signal corresponding to the phase-shifted signal.

In a specific implementation process, reference may be made to the description of the foregoing relevant portions for specific structures of the phase shifter 800 in an antenna according to an embodiment of the present disclosure. The principle of solving the problem of the antenna is similar to that of the phase shifter 800, so the implementation of the antenna may refer to the implementation of the phase shifter 800, and the repeated description is omitted.

The antenna according to the embodiment of the present disclosure further includes a feeding unit 900 and a radiating unit 1000 each coupled to the phase shifter 800, where the feeding unit 900 is configured to couple a received radio frequency signal to the phase shifter 800, so that the phase shifter 800 may perform phase shifting on the radio frequency signal, thereby obtaining a phase-shifted signal. Then, the phase shifter 800 may couple the phase-shifted signal to the radiating unit 1000, and then the radiating unit 1000 radiates an electromagnetic wave signal corresponding to the phase-shifted signal, thereby implementing the communication function of the antenna.

In the embodiment of the present disclosure, the antenna further includes a second dielectric substrate 812 located on a side of the second substrate 20 away from the adjustable dielectric layer 30, and a third conductive layer 813 located between the second dielectric substrate 812 and the second substrate 20, where a pattern of the third conductive layer 813 includes a sixth ground electrode 814.

In a specific implementation process, the antenna further includes a second dielectric substrate 812 located on a side of the second substrate 20 away from the adjustable dielectric layer 30, where the second dielectric substrate 812 may be a glass substrate, a Printed Circuit Board (PCB), a rigid foam board, or the like. The antenna further includes a third conductive layer 813 between the second dielectric substrate 812 and the second substrate 20, where a pattern of the third conductive layer 813 includes a sixth ground electrode 814. In one exemplary embodiment, the adjustable dielectric layer 30 is a liquid crystal, the corresponding antenna is a liquid crystal antenna, and the sixth ground electrode 814 may be attached to the second dielectric substrate 812 and then assembled with the liquid crystal cell formed by the first substrate 10 and the second substrate 20 by using an adhesive or the like. In one exemplary embodiment, the sixth ground electrode 814 may be formed directly on a surface of the second substrate 20 of the liquid crystal cell away from the adjustable dielectric layer 30, through electroplating or the like, and then is assembled to the second dielectric substrate 812.

In the embodiments of the present disclosure, the radiating unit 1000 and the feeding unit 900 may be disposed in the following implementation, but are not limited to the following implementation.

Figure 27:
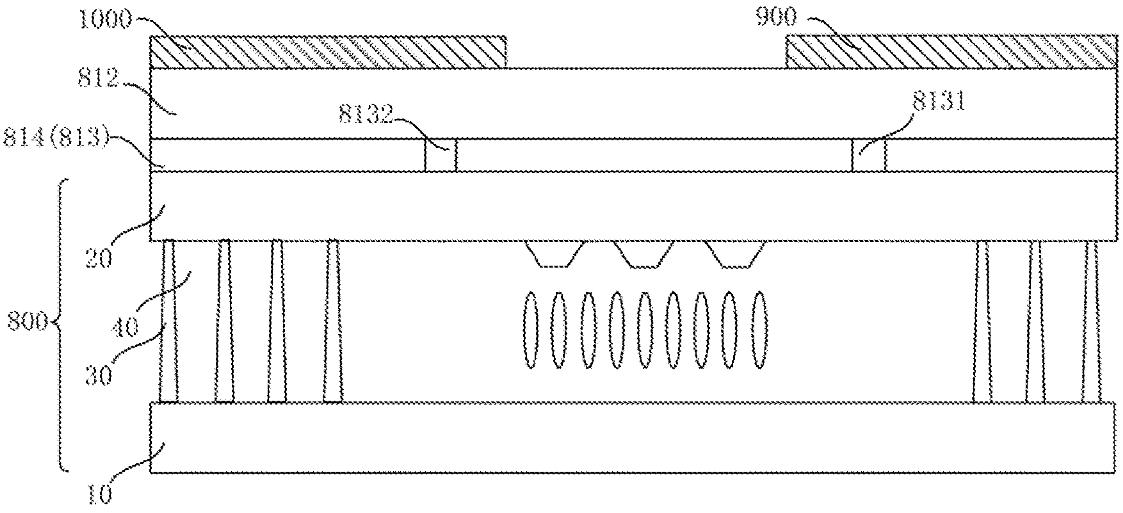
FIG. 27 is a schematic cross-sectional view illustrating a structure taken along a direction KK in FIG. 26.

In one exemplary embodiment, the radiating unit 1000 and the feeding unit 900 may be located on the same side of the second substrate 20, as shown in FIG. 27, which is a schematic cross-sectional view illustrating a structure taken along a direction KK in FIG. 26. Specifically, the radiating unit 1000 and the feeding unit 900 are both located on a side of the second dielectric substrate 812 away from the second substrate 20, and are spaced apart from each other in the same layer, where an orthographic projection of the radiating unit 1000 on the second substrate 20 and an orthographic projection of the feeding unit 900 on the second substrate 20 do not overlap each other. In a practical forming process, the radiating unit 1000 and the feeding unit 900 may be formed in the same layer, thereby simplifying the manufacturing process of the antenna.

Still referring to FIG. 27, the third conductive layer 813 includes a first via 8131 and a second via 8132 penetrating through the third conductive layer in a thickness direction of the third conductive layer, an orthographic projection of the first via 8131 on the second substrate 20 is completely within an orthographic projection of the feeding unit 900 on the second substrate 20, and an orthographic projection of the second via 8132 on the second substrate 20 is completely within an orthographic projection of the radiating unit 1000 on the second substrate 20.

In a specific implementation process, the radio frequency signal received by the feeding unit 900 may be coupled to the phase shifter 800 through the first via 8131, and the radio frequency signal subjected to phase shifting performed by the phase shifter 800 may be coupled to the radiating unit 1000 through the second via 8132. In addition, in this implementation, the feeding unit 900 and the radiating unit 1000 may perform signal transmission with the phase shifter 800 through a coupling capacitor, a metalized via, a waveguide, an air interface feeding, or the like, besides a manner of a coupling slot, such as the via. The specific implementation may refer to the description in the related art, and will not be described in detail herein.

Figure 28:
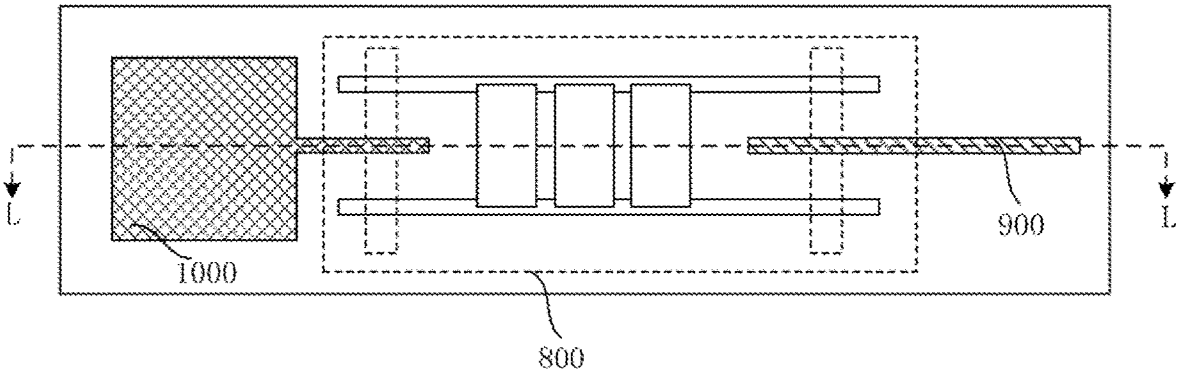
FIG. 28 is a schematic top view illustrating a structure of an antenna according to an embodiment of the present disclosure.
Figure 29:
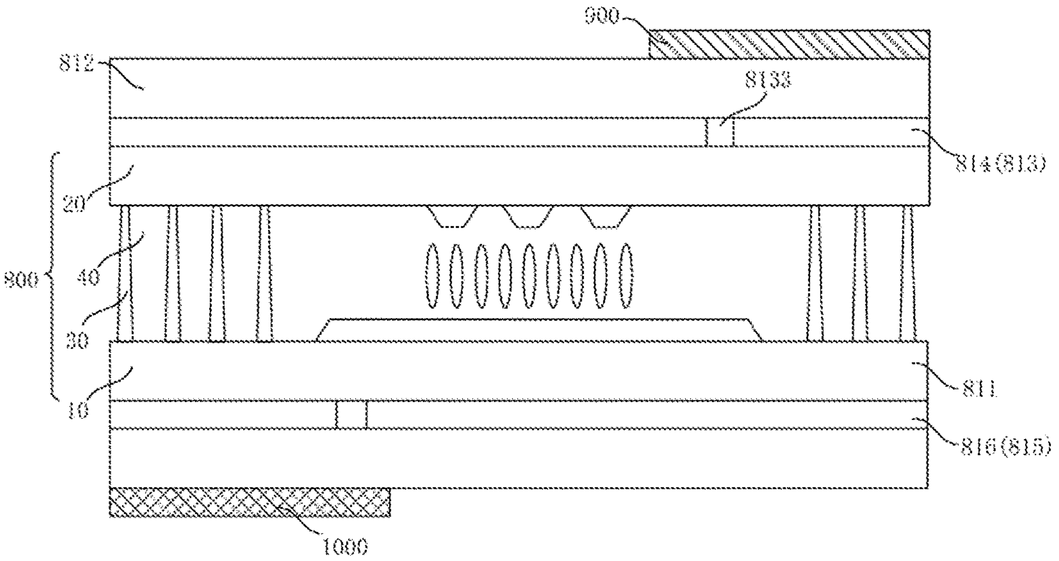
FIG. 29 is a schematic cross-sectional view illustrating a structure taken along direction LL of FIG. 28.

In one exemplary embodiment, see FIGS. 28 and 29, where FIG. 28 is a schematic top view illustrating a structure of an antenna according to the present disclosure, and FIG. 29 is a schematic cross-sectional view illustrating a structure along a direction LL in FIG. 28. Specifically, the feeding unit 900 may be located on a side of the second substrate 20, and the radiating unit 1000 may be located at a side of the first substrate 10. The antenna further includes a first dielectric substrate 811 located on a side of the first substrate 10 away from the adjustable dielectric layer 30, and a fourth conductive layer 815 located between the first dielectric substrate 811 and the first substrate 10. A pattern of the fourth conductive layer 815 includes a seventh ground electrode 816. The feeding unit 900 is located on a side of a second dielectric substrate 812 away from the second substrate 20, and the radiating unit 1000 is located on a side of the first dielectric substrate 811 away from the first substrate 10. An orthographic projection of the feeding unit 900 on the first substrate 10 and an orthographic projection of the radiating unit 1000 on the first substrate 10 do not overlap each other.

Still referring to FIG. 29, the antenna further includes a first dielectric substrate 811 located on a side of the first substrate 10 away from the adjustable dielectric layer 30, and a fourth conductive layer 815 located between the first dielectric substrate 811 and the first substrate 10, where a pattern of the fourth conductive layer 815 includes a seventh ground electrode 816. The first dielectric substrate 811 may be a glass substrate, a Printed Circuit Board (PCB), a rigid foam board, or the like. In addition, the feeding unit 900 may be located on a side of the second dielectric substrate 812 away from the second substrate 20, the radiating unit 1000 may be located on a side of the first dielectric substrate 811 away from the first substrate 10, and an orthographic projection of the feeding unit 900 on the first substrate 10 and an orthographic projection of the radiating unit 1000 on the first substrate 10 do not overlap each other, so that the usability of the antenna is ensured.

Still referring to FIG. 29, a third via 8133 is formed in the third conductive layer 813, a fourth via 8134 is formed in the fourth conductive layer 815, and an orthographic projection of the third via 8133 on the first substrate 10 does not overlap an orthographic projection of the fourth via 8134 on the first substrate 10. In this way, the radio frequency signal received by the feeding unit 900 may be coupled to the phase shifter 800 through the third via 8133, and the radio frequency signal subjected to phase shifting performed by the phase shifter 800 may be coupled to the radiating unit 1000 through the fourth via 8134. In addition, in this implementation, the feeding unit 900 and the radiating unit 1000 may perform signal transmission with the phase shifter 800 through a coupling capacitor, a metalized via, a waveguide, an air interface feeding, or the like, besides a coupling slot such as the via. The specific implementation may refer to the description in the related art, and will not be described in detail herein.

It should be noted that other essential components of the antenna are understood by those skilled in the art, and are not described herein, nor should they be construed as limitations of the present disclosure.

Figure 30:
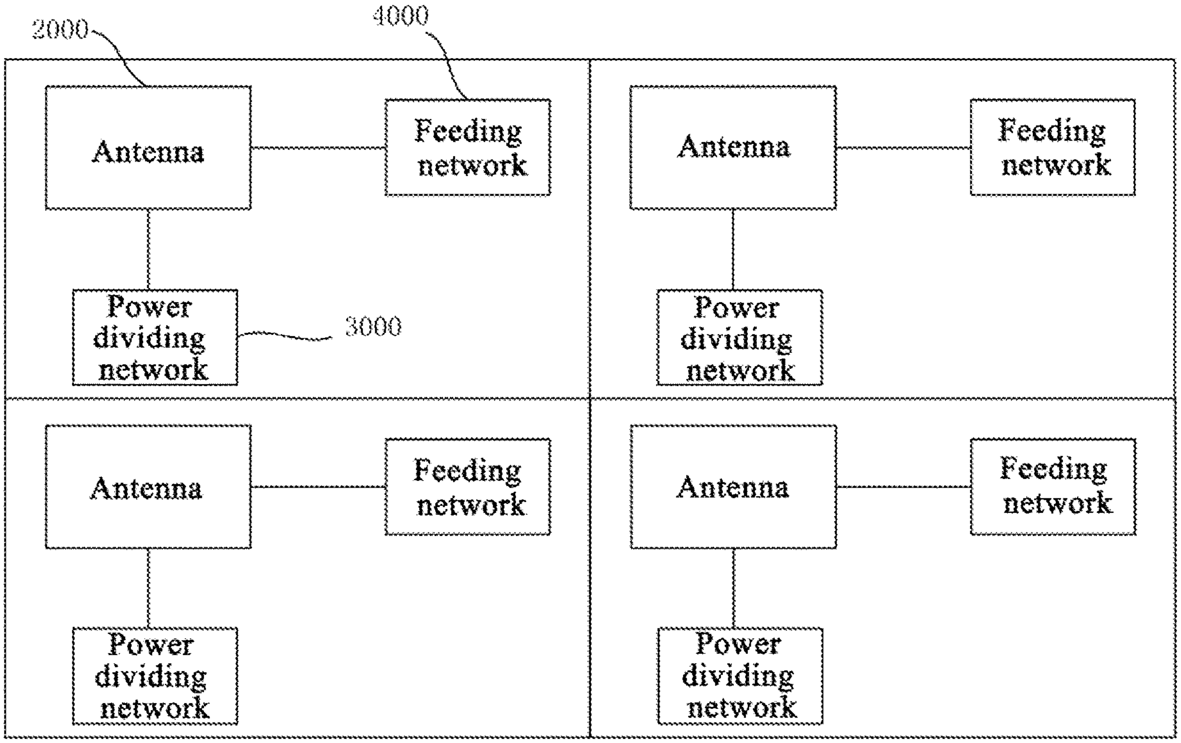
FIG. 30 is a schematic diagram illustrating a distribution of structures of an electronic apparatus according to an embodiment of the present disclosure.

Based on the same disclosure concept, as shown in FIG. 30, an embodiment of the present disclosure further provides an electronic apparatus, including:

an antenna 2000 as described in any one of the above embodiments, a power dividing network 3000 and a feeding network 4000, which are disposed in an array.

In a specific implementation process, the power dividing network 3000 and the feeding network 4000 may be the same network structure. Moreover, as to the specific structures of the power dividing network 3000 and the feeding network 4000, reference may be made to the specific implementation in the related art, and details thereof are not described herein. In addition, the principle of the electronic apparatus for solving the problem is similar to that of the antenna, so the implementation of the electronic apparatus can refer to the implementation of the antenna, and repeated descriptions are omitted herein.

While the preferred embodiments of the present disclosure have been described, additional changes and modifications to those embodiments may be made by those skilled in the art once they learn about the basic inventive concepts. Therefore, it is intended that the appended claims should be interpreted as including the preferred embodiments and all changes and modifications that fall within the scope of the present disclosure.

It will be apparent to those skilled in the art that various changes and variations may be made to the present disclosure without departing from the spirit and scope of the present disclosure. Thus, if such modifications and variations to the present disclosure are within the scope of the claims of the present disclosure and their equivalents, the present disclosure is also intended to encompass such modifications and variations.

What is claimed is:

1. A phase shifter, comprising:

a first substrate and a second substrate opposite to each other;

an adjustable dielectric layer and a plurality of pillar supports, each of which being between the first substrate and the second substrate;

a first conductive layer on a side of the first substrate close to the adjustable dielectric layer; and a second conductive layer on a side of the second substrate close to the adjustable dielectric layer, wherein a pattern of the first conductive layer comprises at least one first electrode, a pattern of the second conductive layer comprises at least one second electrode, and an orthographic projection of the at least one first electrode on the first substrate at least partially overlaps an orthographic projection of the at least one second electrode on the first substrate;

wherein an orthographic projection of each of the plurality of pillar support, which are on the first substrate, on the first substrate and an orthographic projection of the pattern of the first conductive layer on the first substrate do not overlap each other, and the pillar supports of the plurality of pillar supports close to an edge of the pattern of the first conductive layer are equally spaced apart from the edge of the pattern of the first conductive layer.

2. The phase shifter of claim 1, wherein the pillar supports of the plurality of pillar supports close to the edge of the pattern of the first conductive layer are each spaced apart from the edge of the pattern of the first conductive layer by a first distance, and any two adjacent ones of the plurality of pillar supports are spaced apart from each other by a second distance, wherein the first distance is equal to the second distance.

3. The phase shifter of claim 2, wherein the at least one first electrode comprises a first signal sub-electrode and a second signal sub-electrode spaced apart from each other, and a part of the plurality of pillar supports are in a region between the first signal sub-electrode and the second signal sub-electrode.

4. The phase shifter of claim 3, wherein the plurality of pillar supports comprises a plurality of main pillar supports and a plurality of auxiliary pillar supports at intervals on the first substrate, wherein an end of each of the plurality of main pillar supports away from the first substrate is in contact with the second substrate, and an end of each of the plurality of auxiliary pillar supports away from the first substrate is in suspension.

5. The phase shifter of claim 4, wherein an end of each of the plurality of main pillar supports close to the first substrate is in contact with the first substrate.

6. The phase shifter of claim 4, wherein between an end of each of the plurality of main pillar supports close to the first substrate and the first substrate is disposed a padding layer, and a height of each of the plurality of main support sections is equal to a height of each of the plurality of auxiliary pillar supports in a direction pointing from the first substrate to the second substrate.

7. The phase shifter of claim 3, wherein the at least one second electrode comprises a patch electrode attached to the side of the second substrate close to the adjustable dielectric layer, an orthographic projection of the first signal sub-electrode on the first substrate at least partially overlaps an orthographic projection of the patch electrode on the first substrate, and an orthographic projection of the second signal sub-electrode on the first substrate at least partially overlaps the orthographic projection of the patch electrode on the first substrate.

8. The phase shifter of claim 2, wherein the at least one first electrode comprises a first signal electrode, the at least one second electrode comprises a second signal electrode, and the first signal electrode comprises a first main part extending in a first direction, and a plurality of first branch parts each connected to the first main part and extending in a second direction intersecting the first direction; and the second signal electrode comprises a second main part extending in the first direction, and a plurality of second branch parts each connected to the second main part and extending in the second direction, and an orthographic projection of each of the plurality of first branch parts on the first substrate at least partially overlaps an orthographic projection of a corresponding one of the plurality of second branch parts on the first substrate.

9. The phase shifter of claim 7, wherein the at least one first electrode further comprises a plurality of first ground electrodes at intervals on the side of the first substrate close to the adjustable dielectric layer, each of the plurality of first ground electrodes is connected to a second ground electrode on a side of the first substrate away from the adjustable dielectric layer through a via extending through the first substrate, an orthographic projection of each of the plurality of first ground electrodes on the first substrate is completely within an orthographic projection of the second ground electrode on the first substrate, and the orthographic projection of each of the first ground electrodes on the first substrate at least partially overlaps the orthographic projection of the patch electrode on the first substrate.

10. The phase shifter of claim 2, wherein the at least one first electrode comprises a first patch sub-electrode and a second patch sub-electrode attached to the side of the first substrate close to the adjustable dielectric layer and spaced apart from each other, the at least one second electrode comprises a third ground electrode and a third signal electrode, the third ground electrode comprises a first ground sub-electrode and a second ground sub-electrode paced apart from each other, the third signal electrode is located between the first ground sub-electrode and the second ground sub-electrode, and an orthographic projection of the third signal electrode on the first substrate partially overlaps an orthographic projection of the first patch sub-electrode on the first substrate, and partially overlaps an orthographic projection the second patch sub-electrode on the first substrate, and a part of the plurality of pillar supports are in a region between the third ground electrode and the first substrate.

11. The phase shifter of claim 10, wherein a part of the plurality of supports are in a region between the third ground electrode and the third signal electrode.

12. The phase shifter of claim 2, wherein the at least one second electrode comprises a third patch sub-electrode and a fourth patch sub-electrode attached to the side of the second substrate close to the adjustable dielectric layer and spaced apart from each other, the at least one first electrode comprises a fourth ground electrode and a fourth signal electrode, the fourth ground electrode comprises a third ground sub-electrode and a fourth ground sub-electrode spaced apart from each other, the fourth signal electrode is between the third ground sub-electrode and the fourth ground sub-electrode, the third ground sub-electrode comprises a third main part extending in a third direction, and a plurality of third branch parts each connected to the third main part and extending in a fourth direction intersecting the third direction, the fourth ground sub-electrode comprises a fourth main part extending in the third direction, and a plurality of fourth branch parts each connected to the fourth main part and extending in the fourth direction, an orthographic projection of each of the plurality of third branch parts on the first substrate at least partially overlaps an orthographic projection of the third patch sub-electrode on the first substrate, an orthographic projection of each of the plurality of fourth branch parts on the first substrate at least partially overlaps an orthographic projection of the fourth patch electrode on the first substrate, the fourth signal electrode comprises a fifth main part extending in the third direction, and a plurality of fifth branch parts each connected to the fifth main part and extending in the fourth direction, an orthographic projection of the plurality of fifth branch parts on the first substrate at least partially overlaps the orthographic projections of the third patch sub-electrode and the fourth patch sub-electrode on the first substrate.

13. The phase shifter of claim 2, wherein the at least one second electrode comprises a patch electrode attached to the side of the second substrate close to the adjustable dielectric layer, the at least one first electrode comprises a fifth ground electrode and a fifth signal electrode, the fifth ground electrode comprises a fifth ground sub-electrode and a sixth ground sub-electrode spaced apart from each other, the fifth signal electrode is between the fifth ground sub-electrode and the sixth ground sub-electrode, and an orthographic projection of the fifth signal electrode on the first substrate is completely within an orthographic projection of the patch electrode on the first substrate.

14. An antenna, comprising:

the phase shifter of claim 1; and a feeding unit and a radiating unit each coupled to the phase shifter, wherein the feeding unit is configured to couple a radio frequency signal received by the feeding unit to the phase shifter, the phase shifter is configured to shift a phase of the radio frequency signal to obtain a phase-shifted signal, and couple the phase-shifted signal to the radiating unit, such that the radiating unit radiates an electromagnetic wave signal corresponding to the phase-shifted signal.

15. The antenna of claim 14, further comprising a second dielectric substrate on a side of the second substrate away from the adjustable dielectric layer, and a third conductive layer between the second dielectric substrate and the second substrate, wherein a pattern of the third conductive layer comprises a sixth ground electrode.

16. The antenna of claim 15, wherein the radiating unit and the feeding unit are both on a side of the second dielectric substrate away from the second substrate and are spaced apart from each other in a same layer, and an orthographic projection of the radiating unit on the second substrate and an orthographic projection of the feeding unit on the second substrate do not overlap each other.

17. The antenna of claim 16, wherein the third conductive layer comprises a first via and a second via penetrating through the third conductive layer in a thickness direction of the third conductive layer, an orthographic projection of the first via on the second substrate is completely within the orthographic projection of the feeding unit on the second substrate, and an orthographic projection of the second via on the second substrate is completely within the orthographic projection of the radiating unit on the second substrate.

18. The antenna of claim 15, further comprising a first dielectric substrate on a side of the first substrate away from the adjustable dielectric layer, and a fourth conductive layer between the first dielectric substrate and the first substrate, wherein a pattern of the fourth conductive layer comprises a seventh ground electrode, the feeding unit is on a side of the second dielectric substrate away from the second substrate, the radiating unit is on a side of the first dielectric substrate away from the first substrate, and an orthographic projection of the feeding unit on the first substrate does not overlap an orthographic projection of the radiating unit on the first substrate.

19. The antenna of claim 18, wherein a third via is formed in the third conductive layer, a fourth via is formed in the fourth conductive layer, and an orthographic projection of the third via on the first substrate and an orthographic projection of the fourth via on the first substrate do not overlap each other.

20. An electronic apparatus, comprising:

the antennas of claim 14, power dividing networks and feeding networks, which are in an array.

* * * * *